US010979203B2

(12) United States Patent
Sadek et al.

(10) Patent No.: US 10,979,203 B2
(45) Date of Patent: Apr. 13, 2021

(54) CHANNEL SELECTION TO REDUCE INTERFERENCE TO A WIRELESS LOCAL AREA NETWORK FROM A CELLULAR NETWORK

(71) Applicant: QUALCOMM Incorporated, San Diego, CA (US)

(72) Inventors: Ahmed Kamel Sadek, San Diego, CA (US); Yeliz Tokgoz, San Diego, CA (US); Mehmet Yavuz, San Diego, CA (US); Tamer Adel Kadous, San Diego, CA (US); Mingxi Fan, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 14/475,773

(22) Filed: Sep. 3, 2014

(65) Prior Publication Data
US 2015/0063323 A1 Mar. 5, 2015

Related U.S. Application Data

(60) Provisional application No. 61/873,554, filed on Sep. 4, 2013, provisional application No. 61/914,626, filed on Dec. 11, 2013.

(51) Int. Cl.
*H04L 5/00* (2006.01)
*H04W 56/00* (2009.01)
(Continued)

(52) U.S. Cl.
CPC ......... *H04L 5/0073* (2013.01); *H04W 56/001* (2013.01); *H04W 72/1215* (2013.01); *H04W 88/10* (2013.01); *H04W 16/14* (2013.01)

(58) Field of Classification Search
None
See application file for complete search history.

(56) References Cited

U.S. PATENT DOCUMENTS 5,963,848 A * 10/1999 D'Avello ............ H04W 72/082
455/450
7,450,943 B2 11/2008 Black et al.
(Continued)

FOREIGN PATENT DOCUMENTS

CN 101521924 A 9/2009
CN 103339885 A 10/2013
(Continued)

OTHER PUBLICATIONS

International Search Report and Written Opinion—PCT/US2014/054006—ISA/EPO—dated Nov. 12, 2014.
Taiwan Search Report—TW103130604—TIPO—dated Aug. 2, 2018.

*Primary Examiner* — Jeffrey M Rutkowski
*Assistant Examiner* — Mehedi S Aley
(74) *Attorney, Agent, or Firm* — Muncy, Geissler, Olds & Lowe, P.C.

(57) ABSTRACT

Disclosed are systems and methods for selecting an operating channel for a cellular network to reduce interference to a wireless local area network (WLAN) operated by a small cell comprising a WLAN access point and a cellular network modem. The small cell performs a channel scan of available channels, determines whether or not there is a clean channel to be the operating channel for the cellular network based on the channel scan, wherein a clean channel comprises a channel that interferes with the WLAN less than a WLAN interference threshold, and selects the clean channel as the operating channel for the cellular network based on the clean channel being available or turns off the cellular network based on no clean channel being available.

64 Claims, 15 Drawing Sheets

(51) Int. Cl.
*H04W 88/10* (2009.01)
*H04W 72/12* (2009.01)
*H04W 16/14* (2009.01)

(56) References Cited

U.S. PATENT DOCUMENTS

| | | |
|---|---|---|
| 7,636,550 B2 | 12/2009 | Yuen et al. |
| 8,139,528 B2 | 3/2012 | Gupta et al. |
| 8,577,377 B2 | 11/2013 | Shellhammer et al. |
| 8,588,148 B2 | 11/2013 | Huo et al. |
| 8,675,623 B2 | 3/2014 | Sadek et al. |
| 8,938,238 B2 | 1/2015 | Yavuz et al. |
| 2004/0259555 A1 | 12/2004 | Rappaport et al. |
| 2005/0265288 A1* | 12/2005 | Liu .................. H04W 72/082 370/332 |
| 2006/0025149 A1 | 2/2006 | Karaoguz et al. |
| 2006/0029023 A1 | 2/2006 | Cervello et al. |
| 2007/0211677 A1 | 9/2007 | Laroia et al. |
| 2008/0057956 A1* | 3/2008 | Black .................. H04W 48/10 455/435.1 |
| 2008/0113692 A1 | 5/2008 | Zhao et al. |
| 2009/0221231 A1* | 9/2009 | Weng ............. H04B 7/15585 455/15 |
| 2009/0262785 A1 | 10/2009 | Wilhelmsson et al. |
| 2009/0285116 A1 | 11/2009 | Nanda et al. |
| 2009/0310565 A1 | 12/2009 | Huo et al. |
| 2010/0284303 A1 | 11/2010 | Catovic et al. |
| 2010/0316003 A1* | 12/2010 | Sukiasyan ............ H04W 72/02 370/329 |
| 2012/0040620 A1 | 2/2012 | Fu et al. |
| 2012/0058728 A1 | 3/2012 | Wang et al. |
| 2012/0082140 A1 | 4/2012 | Lin et al. |
| 2012/0093009 A1 | 4/2012 | Wang et al. |
| 2012/0184322 A1 | 7/2012 | Falconetti et al. |
| 2012/0230263 A1 | 9/2012 | Nam et al. |
| 2012/0231806 A1 | 9/2012 | Maric et al. |
| 2012/0252394 A1 | 10/2012 | Balakrishnan et al. |
| 2012/0276859 A1* | 11/2012 | Callender ............ H04B 1/1036 455/77 |
| 2013/0064118 A1 | 3/2013 | Robinson et al. |
| 2013/0064197 A1 | 3/2013 | Novak et al. |
| 2013/0065600 A1 | 3/2013 | Lim |
| 2013/0083661 A1 | 4/2013 | Gupta et al. |
| 2013/0094390 A1* | 4/2013 | Chhabra ............... H04W 48/20 370/252 |
| 2013/0155991 A1 | 6/2013 | Kazmi et al. |
| 2013/0165134 A1 | 6/2013 | Touag et al. |
| 2013/0203401 A1 | 8/2013 | Ryan et al. |
| 2013/0208587 A1 | 8/2013 | Bala et al. |
| 2013/0250787 A1 | 9/2013 | Zhang |
| 2013/0260807 A1* | 10/2013 | Suresh .................. H04W 24/02 455/501 |
| 2014/0086081 A1 | 3/2014 | Mack et al. |
| 2014/0177486 A1 | 6/2014 | Wang et al. |
| 2014/0378157 A1* | 12/2014 | Wei ...................... H04W 16/14 455/454 |
| 2015/0009962 A1* | 1/2015 | Clegg ................ H04W 72/042 370/331 |
| 2015/0156693 A1 | 6/2015 | Tabet et al. |
| 2015/0195845 A1 | 7/2015 | Wang et al. |
| 2015/0282064 A1* | 10/2015 | Patil ..................... H04W 48/20 370/329 |
| 2015/0305040 A1 | 10/2015 | Xia et al. |
| 2015/0305050 A1 | 10/2015 | Xia |
| 2015/0305051 A1 | 10/2015 | Xia |
| 2016/0037560 A1* | 2/2016 | Liu ........................ H04L 51/34 370/329 |

FOREIGN PATENT DOCUMENTS

| | | |
|---|---|---|
| CN | 103582081 A | 2/2014 |
| CN | 103813368 A | 5/2014 |
| EP | 1257137 A2 | 11/2002 |
| EP | 2262338 A2 | 12/2010 |
| EP | 2675205 A2 | 12/2013 |
| EP | 2696530 A2 | 2/2014 |
| JP | 2010288280 A | 12/2010 |
| JP | 2014529979 A | 11/2014 |
| WO | 2004073348 A1 | 8/2004 |
| WO | 2009096980 | 8/2009 |
| WO | 2010085264 A1 | 7/2010 |
| WO | 2010088578 A2 | 8/2010 |
| WO | 2011057152 A1 | 5/2011 |
| WO | 2013036487 A1 | 3/2013 |
| WO | 2013106740 A2 | 7/2013 |
| WO | 2013112983 A2 | 8/2013 |

\* cited by examiner

CHANNEL SELECTION TO REDUCE INTERFERENCE TO A WIRELESS LOCAL AREA NETWORK FROM A CELLULAR NETWORK

CROSS-REFERENCE TO RELATED APPLICATIONS

The present application for patent claims the benefit of U.S. Provisional Application No. 61/873,554, entitled "CHANNEL SELECTION TO REDUCE INTERFERENCE TO A WIRELESS LOCAL AREA NETWORK FROM A CELLULAR NETWORK," filed Sep. 4, 2013, and U.S. Provisional Application No. 61/914,626, entitled "MINIMIZING WI-FI ACCESS POINT MISDETECTION FOR CHANNEL SELECTION FOR LTE/LTE ADVANCED IN UNLICENSED SPECTRUM IN THE PRESENCE OF INTERFERENCE," filed Dec. 11, 2013, assigned to the assignee hereof, and expressly incorporated herein by reference in their entirety.

DESCRIPTION OF THE RELATED ART

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). Examples of such multiple-access systems include code division multiple access (CDMA) systems, time division multiple access (TDMA) systems, frequency division multiple access (FDMA) systems, orthogonal frequency division multiple access (OFDMA) systems, and others. These systems are often deployed in conformity with specifications such as third generation partnership project (3GPP), 3GPP long term evolution (LTE), ultra mobile broadband (UMB), evolution data optimized (EV-DO), etc.

In cellular networks, macro scale base stations (or macro NodeBs (MNBs)) provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To extend cellular coverage indoors, such as for residential homes and office buildings, additional small coverage, typically low power base stations have recently begun to be deployed to supplement conventional macro networks, providing more robust wireless coverage for mobile devices. These small coverage base stations are commonly referred to as Home NodeBs or Home eNBs (collectively, H(e)NBs), femto nodes, femtocells, femtocell base stations, pico nodes, micro nodes, etc., deployed for incremental capacity growth, richer user experience, in-building or other specific geographic coverage, and so on. Such small coverage base stations may be connected to the Internet and the mobile operator's network via a digital subscriber line (DSL) router or a cable modem, for example.

An unplanned deployment of large numbers of small coverage base stations, however, can be challenging in several respects.

SUMMARY

The disclosure is related to selecting an operating channel for a cellular network to reduce interference to a wireless local area network (WLAN) operated by a small cell. A method for selecting an operating channel for a cellular network to reduce interference to a WLAN operated by a small cell includes performing, by the small cell, a channel scan of available channels, the small cell comprising a WLAN access point and a cellular network modem, determining whether or not there is a clean channel to be the operating channel for the cellular network based on the channel scan, wherein a clean channel comprises a channel that interferes with the WLAN less than a WLAN interference threshold, and selecting the clean channel as the operating channel for the cellular network based on the clean channel being available or turning off the cellular network based on no clean channel being available.

Another method for selecting an operating channel for a cellular network to reduce interference to a WLAN operated by a small cell includes performing, by a cellular network modem of the small cell, a first channel scan of available channels for operating the cellular network, performing, by a WLAN access point of the small cell, a second channel scan of the available channels for operating the cellular network, identifying, based on the first channel scan, one or more cellular network channels of the available channels that have an interference level below a cellular network interference threshold, determining, based on the second channel scan, whether or not there is a clean channel in the identified one or more cellular network channels to be the operating channel for the cellular network, wherein a clean channel comprises a channel that interferes with the WLAN less than a WLAN interference threshold, and selecting the clean channel as the operating channel for the cellular network based on the clean channel being available or turning off the cellular network based on no clean channel being available.

An apparatus for selecting an operating channel for a cellular network to reduce interference to a WLAN operated by a small cell includes logic configured to perform, by the small cell, a channel scan of available channels, wherein the small cell comprises a WLAN access point and a cellular network modem, logic configured to determine whether or not there is a clean channel to be the operating channel for the cellular network based on the channel scan, wherein a clean channel comprises a channel that interferes with the WLAN less than a WLAN interference threshold, and logic configured to select the clean channel as the operating channel for the cellular network based on the clean channel being available or to turn off the cellular network based on no clean channel being available.

Another apparatus for selecting an operating channel for a cellular network to reduce interference to a wireless local area network (WLAN) operated by a small cell includes logic configured to perform, by a cellular network modem of the small cell, a first channel scan of available channels for operating the cellular network, logic configured to perform, by a WLAN access point of the small cell, a second channel scan of the available channels for operating the cellular network, logic configured to identify, based on the first channel scan, one or more cellular network channels of the available channels that have an interference level below a cellular network interference threshold, logic configured to determine, based on the second channel scan, whether or not there is a clean channel in the identified one or more cellular network channels to be the operating channel for the cellular network, wherein a clean channel comprises a channel that interferes with the WLAN less than a WLAN interference threshold, and logic configured to select the clean channel as the operating channel for the cellular network based on the clean channel being available or to turn off the cellular network based on no clean channel being available.

A small cell base station capable of selecting an operating channel for a cellular network to reduce interference to a WLAN operated by the small cell base station includes a cellular network modem, an WLAN access point configured to perform an initial channel scan of available channels, and a processor configured to determine whether or not there is a clean channel to be the operating channel for the cellular network based on the channel scan, wherein a clean channel comprises a channel that interferes with the WLAN less than a WLAN interference threshold, and to select the clean channel as the operating channel for the cellular network based on the clean channel being available or to turn off the cellular network based on no clean channel being available.

A small cell base station capable of selecting an operating channel for a cellular network to reduce interference to a WLAN operated by the small cell base station includes a cellular network modem configured to perform a first channel scan of available channels for operating the cellular network, a WLAN access point configured to perform a second channel scan of the available channels for operating the cellular network, and a processor configured to identify, based on the first channel scan, one or more cellular network channels of the available channels that have an interference level below a cellular network interference threshold, to determine, based on the second channel scan, whether or not there is a clean channel in the identified one or more cellular network channels to be the operating channel for the cellular network, wherein a clean channel comprises a channel that interferes with the WLAN less than a WLAN interference threshold, and to select the clean channel as the operating channel for the cellular network based on the clean channel being available or to turn off the cellular network based on no clean channel being available.

An apparatus for selecting an operating channel for a cellular network to reduce interference to a wireless local area network (WLAN) operated by a small cell includes means for performing, by the small cell, a channel scan of available channels, the small cell comprising a WLAN access point and a cellular network modem, means for determining whether or not there is a clean channel to be the operating channel for the cellular network based on the channel scan, wherein a clean channel comprises a channel that interferes with the WLAN less than a WLAN interference threshold, and means for selecting the clean channel as the operating channel for the cellular network based on the clean channel being available or turning off the cellular network based on no clean channel being available.

An apparatus for selecting an operating channel for a cellular network to reduce interference to a WLAN operated by a small cell includes means for performing, by a cellular network modem of the small cell, a first channel scan of available channels for operating the cellular network, means for performing, by a WLAN access point of the small cell, a second channel scan of the available channels for operating the cellular network, means for identifying, based on the first channel scan, one or more cellular network channels of the available channels that have an interference level below a cellular network interference threshold, means for determining, based on the second channel scan, whether or not there is a clean channel in the identified one or more cellular network channels to be the operating channel for the cellular network, wherein a clean channel comprises a channel that interferes with the WLAN less than a WLAN interference threshold, and means for selecting the clean channel as the operating channel for the cellular network based on the clean channel being available or turning off the cellular network based on no clean channel being available.

A non-transitory computer-readable medium for selecting an operating channel for a cellular network to reduce interference to a WLAN operated by a small cell includes at least one instruction to perform, by the small cell, a channel scan of available channels, wherein the small cell comprises a WLAN access point and a cellular network modem, at least one instruction to determine whether or not there is a clean channel to be the operating channel for the cellular network based on the channel scan, wherein a clean channel comprises a channel that interferes with the WLAN less than a WLAN interference threshold, and at least one instruction to select the clean channel as the operating channel for the cellular network based on the clean channel being available or to turn off the cellular network based on no clean channel being available.

A non-transitory computer-readable medium for selecting an operating channel for a cellular network to reduce interference to a WLAN operated by a small cell includes at least one instruction to perform, by a cellular network modem of the small cell, a first channel scan of available channels for operating the cellular network, at least one instruction to perform, by a WLAN access point of the small cell, a second channel scan of the available channels for operating the cellular network, at least one instruction to identify, based on the first channel scan, one or more cellular network channels of the available channels that have an interference level below a cellular network interference threshold, at least one instruction to determine, based on the second channel scan, whether or not there is a clean channel in the identified one or more cellular network channels to be the operating channel for the cellular network, wherein a clean channel comprises a channel that interferes with the WLAN less than a WLAN interference threshold, and at least one instruction to select the clean channel as the operating channel for the cellular network based on the clean channel being available or to turn off the cellular network based on no clean channel being available.

BRIEF DESCRIPTION OF THE DRAWINGS

The accompanying drawings are presented to aid in the description of the various aspects of the disclosure and are provided solely for illustration and not limitation thereof.

DETAILED DESCRIPTION

Figure 1:
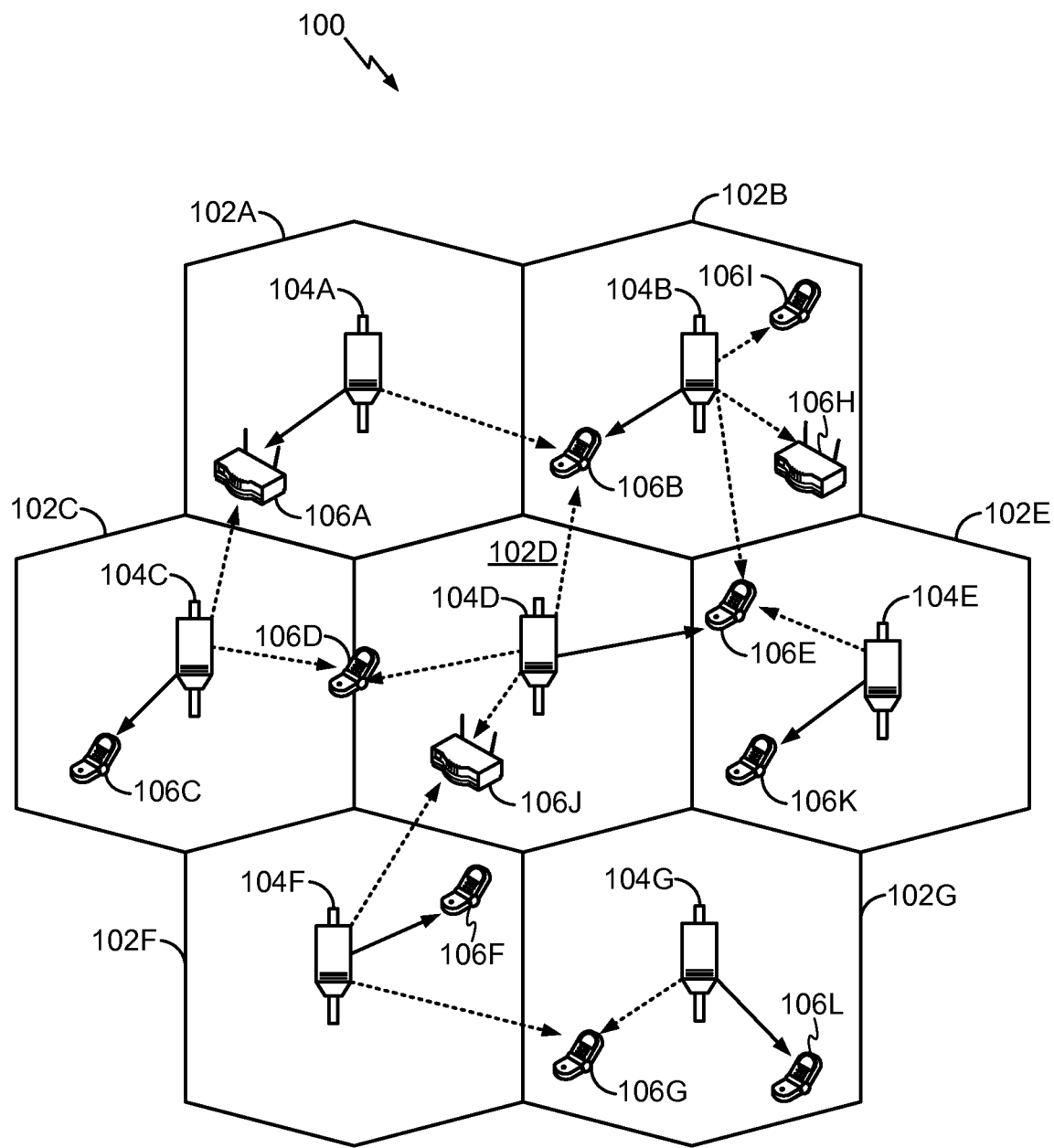
FIG. 1 illustrates an example wireless communication network demonstrating the principles of multiple access communication.

The disclosure relates to channel selection to reduce interference to a wireless local area network (WLAN) from a cellular network. A small cell may establish a cellular network, such as a Long Term Evolution (LTE)/LTE Advanced network in unlicensed spectrum, in addition to a WLAN, provided there is a "clean" channel available on which to establish the cellular network. The small cell may determine whether or not a clean channel is available using measurements gathered by its co-located access point (AP), in addition to, or instead of, measurements that its co-located cellular modem, such as a femtocell station modem (FSM), would otherwise gather itself. The AP can provide these measurements to the cellular modem using the small cell's controller/processor and/or internal bus. The measurements may come from the network listen module (NLM) and/or attached user devices. By only establishing a cellular network on a clean channel, the cellular network's interference with the WLAN is mitigated.

The disclosure further relates to minimizing WLAN AP misdetection for channel selection for LTE/LTE Advanced in unlicensed spectrum in the presence of interference. To mitigate AP misdetection, the small cell can leverage its co-located NLM for LTE/LTE Advanced in unlicensed spectrum measurements and use it to appropriately filter WLAN AP scan reports. First, the small cell avoids channels with a strong presence in the LTE/LTE Advanced in unlicensed spectrum. Among the remaining weak channels in the LTE/LTE Advanced in unlicensed spectrum, assuming that at least one is available, the small cell uses a WLAN threshold to determine clean/unclean channels. If a subset of the channels has a strong presence in the LTE/LTE Advanced in unlicensed spectrum, the small cell "freezes" the channel database or uses Successive Interference Cancellation (SIC) to detect the beacons on those channels.

These and other aspects are described in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, various aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be employed in networks that include macro scale coverage (e.g., a large area cellular network such as 3G or 4G networks, typically referred to as a macro cell network) and smaller scale coverage (e.g., a residence-based or building-based network environment). As a user device moves through such networks, the user device may be served in certain locations by base stations that provide macro coverage and at other locations by base stations that provide smaller scale coverage. As discussed briefly in the background above, the smaller coverage base stations may be used to provide significant capacity growth, in-building coverage, and in some cases different services for a more robust user experience. In the discussion herein, a base station that provides coverage over a relatively large area is usually referred to as a macro base station, while a base station that provides coverage over a relatively small area (e.g., a residence) is usually referred to as a femto base station or a small cell. Intermediate base stations that provide coverage over an area that is smaller than a macro area but larger than a femto area are usually referred to as pico base stations (e.g., providing coverage within a commercial building). For convenience, however, the disclosure herein may describe various functionalities related to small coverage base stations in the context of a femto base station, with the understanding that a pico base station may provide the same or similar functionality for a larger coverage area. A cell associated with a macro base station, a femto base station, or a pico base station may be referred to as a macrocell, a femtocell, or a picocell, respectively. In some system implementations, each cell may be further associated with (e.g., divided into) one or more sectors.

In various applications, it will be appreciated that other terminology may be used to reference a macro base station, a femto base station, a pico base station, a user device, and other devices, and that the use of such terms is generally not intended to invoke or exclude a particular technology in relation to the aspects described or otherwise facilitated by the description herein. For example, a macro base station may be configured or alternatively referred to as a macro node, NodeB, evolved NodeB (eNodeB), macrocell, and so on. A femto base station may be configured or alternatively referred to as a femto node, Home NodeB, Home eNodeB, femtocell, a small cell, and so on. A user device may be configured or alternatively referred to as a device, user equipment (UE), subscriber unit, subscriber station, mobile station, mobile device, access terminal, and so on. For convenience, the disclosure herein will tend to describe various functionalities in the context of generic "base stations" and "user devices," which, unless otherwise indicated by the particular context of the description, are intended to cover the corresponding technology and terminology in all wireless systems.

FIG. 1 illustrates an example wireless communication network demonstrating the principles of multiple access communication. The illustrated wireless communication network 100 is configured to support communication between a number of users. As shown, the wireless communication network 100 may be divided into one or more cells 102, such as the illustrated cells 102A-102G. Communication coverage in cells 102A-102G may be provided by one or more base stations 104, such as the illustrated base stations 104A-104G. In this way, each base station 104 may provide communication coverage to a corresponding cell 102. The base station 104 may interact with a plurality of user devices 106, such as the illustrated user devices 106A-106L.

Each user device 106 may communicate with one or more of the base stations 104 on a downlink (DL) and/or an uplink (UL). In general, a DL is a communication link from a base station to a user device, while an UL is a communication link from a user device to a base station. The base stations 104 may be interconnected by appropriate wired or wireless interfaces allowing them to communicate with each other and/or other network equipment. Accordingly, each user device 106 may also communicate with another user device 106 through one or more of the base stations 104. For example, the user device 106J may communicate with the user device 106H in the following manner: the user device 106J may communicate with the base station 104D, the base station 104D may then communicate with the base station 104B, and the base station 104B may then communicate with the user device 106H, allowing communication to be established between the user device 106J and the user device 106H.

The wireless communication network 100 may provide service over a large geographic region. For example, the cells 102A-102G may cover a few blocks within a neighborhood or several square miles in a rural environment. As noted above, in some systems, each cell may be further divided into one or more sectors (not shown). In addition, the base stations 104 may provide the user devices 106 access within their respective coverage areas to other communication networks, such as the Internet or another cellular network. As further mentioned above, each user device 106 may be a wireless communication device (e.g., a mobile phone, router, personal computer, server, etc.) used by a user to send and receive voice or data over a communications network, and may be alternatively referred to as an access terminal (AT), a mobile station (MS), a user equipment (UE), etc. In the example shown in FIG. 1, the user devices 106A, 106H, and 106J comprise routers, while the user devices 106B-106G, 106I, 106K, and 106L comprise mobile phones. Again, however, each of the user devices 106A-106L may comprise any suitable communication device.

Figure 2A:
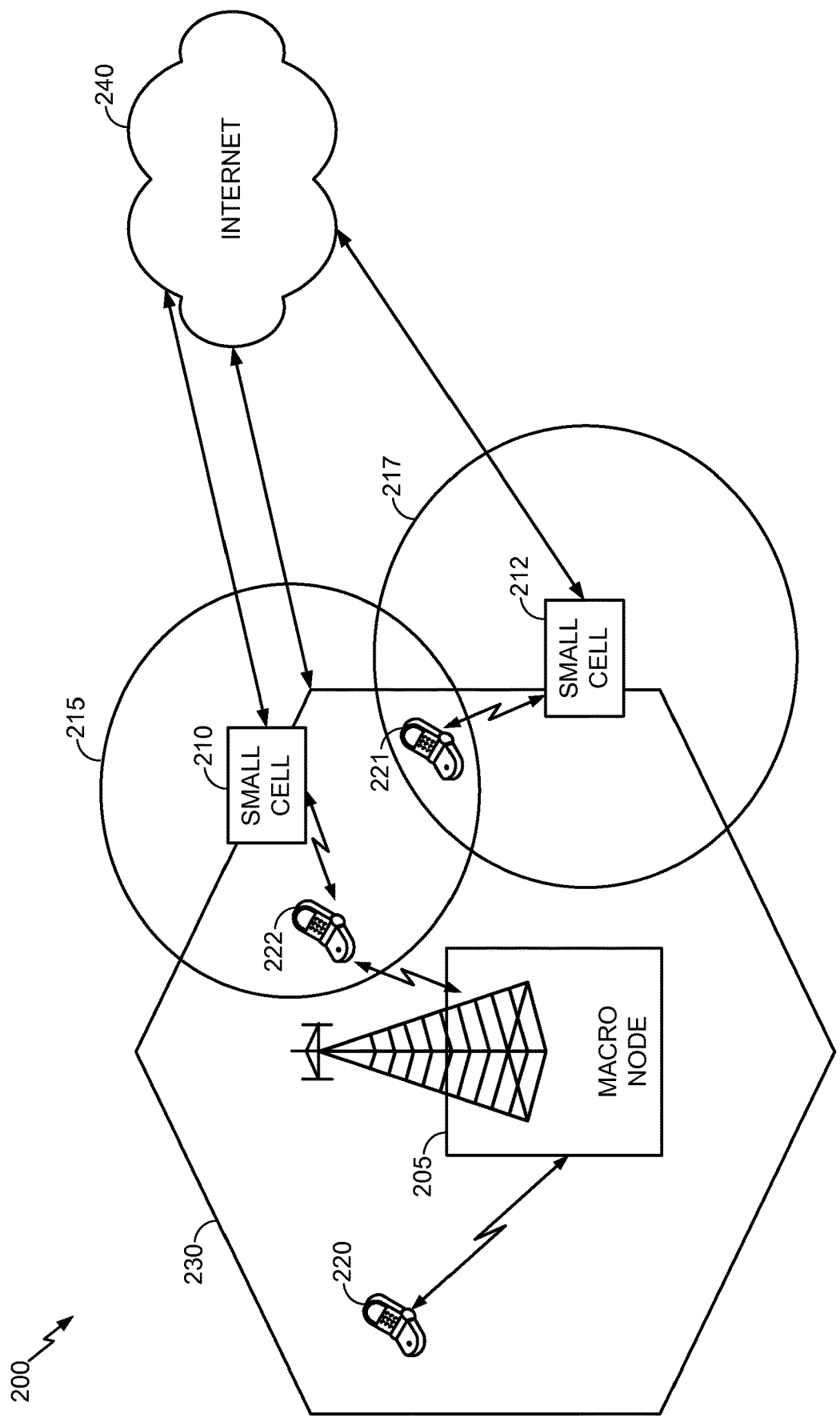
FIG. 2A illustrates an example mixed communication network environment in which small cells are deployed in conjunction with macro cells.

FIG. 2A illustrates an example mixed communication network environment 200 in which small cells 210 and 212 are deployed in conjunction with macro cells. Here, a macro base station 205 may provide communication coverage to one or more user devices, such as the illustrated user devices 220, 221, and 222, within a macro area 230, while small cells 210 and 212 may provide their own communication coverage within respective areas 215 and 217, with varying degrees of overlap among the different coverage areas. In this example, at least some user devices, such as the illustrated user device 222, may be capable of operating both in macro environments (e.g., macro areas) and in smaller scale network environments (e.g., residential, femto areas, pico areas, etc.).

In the connections shown, the user device 220 may generate and transmit a message via a wireless link to the macro base station 205, the message including information related to various types of communication (e.g., voice, data, multimedia services, etc.). The user device 222 may similarly communicate with the small cell 210 via a wireless link, and the user device 221 may similarly communicate with the small cell 212 via a wireless link. The macro base station 205 may also communicate with a corresponding wide area or external network 240 (e.g., the Internet), via a wired link or via a wireless link, while the small cell 210 and 212 may also similarly communicate with the network 240, via their own wired or wireless links. For example, the small cell 210 and 212 may communicate with the network 240 by way of an Internet Protocol (IP) connection, such as via a digital subscriber line (DSL, e.g., including asymmetric DSL (ADSL), high data rate DSL (HDSL), very high speed DSL (VDSL), etc.), a TV cable carrying IP traffic, a broadband over power line (BPL) connection, an optical fiber (OF) link, or some other link.

The network 240 may comprise any type of electronically connected group of computers and/or devices, including, for example, the following networks: Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 240 includes network variations such as the public Internet, a private network within the Internet, a secure network within the Internet, a private network, a public network, a value-added network, an intranet, and the like. In certain systems, the network 240 may also comprise a virtual private network (VPN).

Accordingly, it will be appreciated that the macro base station 205 and/or either or both of the small cells 210 and 212 may be connected to the network 240 using any of a multitude of devices or methods. These connections may be referred to as the "backbone" or the "backhaul" of the network. Devices such as a radio network controller (RNC), base station controller (BSC), or another device or system (not shown) may be used to manage communications between two or more macro base stations, pico base stations, and/or small cells. In this way, depending on the current location of the user device 222, for example, the user device 222 may access the communication network 240 by the macro base station 205 or by the small cell 210.

Figure 2B:
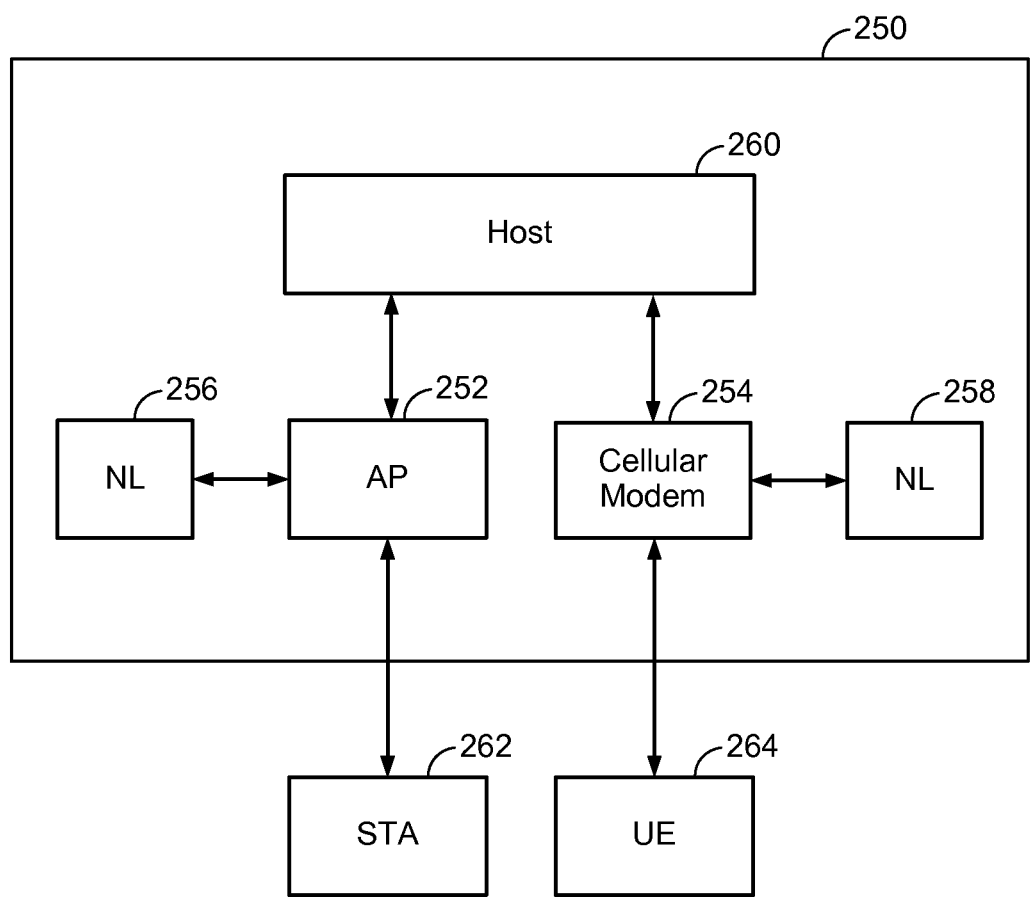
FIG. 2B illustrates an example of a small cell according to one or more aspects of the disclosure.

FIG. 2B illustrates an example of a small cell 250 according to one or more aspects of the disclosure. The small cell 250 may correspond to the small cell 210 and/or the small cell 212 illustrated in FIG. 2A. The small cell 250 may be able to provide a wireless local area network (WLAN) air interface (e.g., in accordance with an IEEE 802.11x protocol) as well as a cellular air interface (e.g., in accordance with an LTE protocol). As shown, in this regard the small cell 250 can include an 802.11x Access Point (AP) 252 co-located with a cellular modem 254, such as a Femtocell Station Modem (FSM). The AP 252 and cellular modem 254 may perform monitoring of one or more channels (e.g., on a corresponding carrier frequency) to determine a corresponding channel quality (e.g., received signal strength) using corresponding network listen (NL) modules 256 and 258, respectively, or other suitable component(s). Although illustrated as separate modules, the NL modules 256 and 258 may reside on a single NL module.

The small cell 250 may also include a host 260, which may include one or more general purpose controllers or processors and memory configured to store related data or instructions. The host 260 may perform processing in accordance with the appropriate radio technology or technologies used for communication, as well as other functions for the small cell 250.

The small cell 250 may communicate with one or more wireless devices via the AP 252 and the cellular modem 254, illustrated as a station (STA) 262 and a UE 264, respectively. While FIG. 2B illustrates a single STA 262 and a single UE 264, it will be appreciated that the small cell 250 can communicate with multiple STAs and/or UEs. Additionally, while FIG. 2B illustrates one type of wireless device communicating with the small cell 250 via the AP 252 (i.e., the STA 262) and another type of wireless device communicating with the small cell 250 via the cellular modem 254 (i.e., the UE 264), it will be appreciated that a single wireless device may be capable of communicating with the small cell 250 via both of the AP 252 and the cellular modem 254, either simultaneously or at different times.

Figure 3:
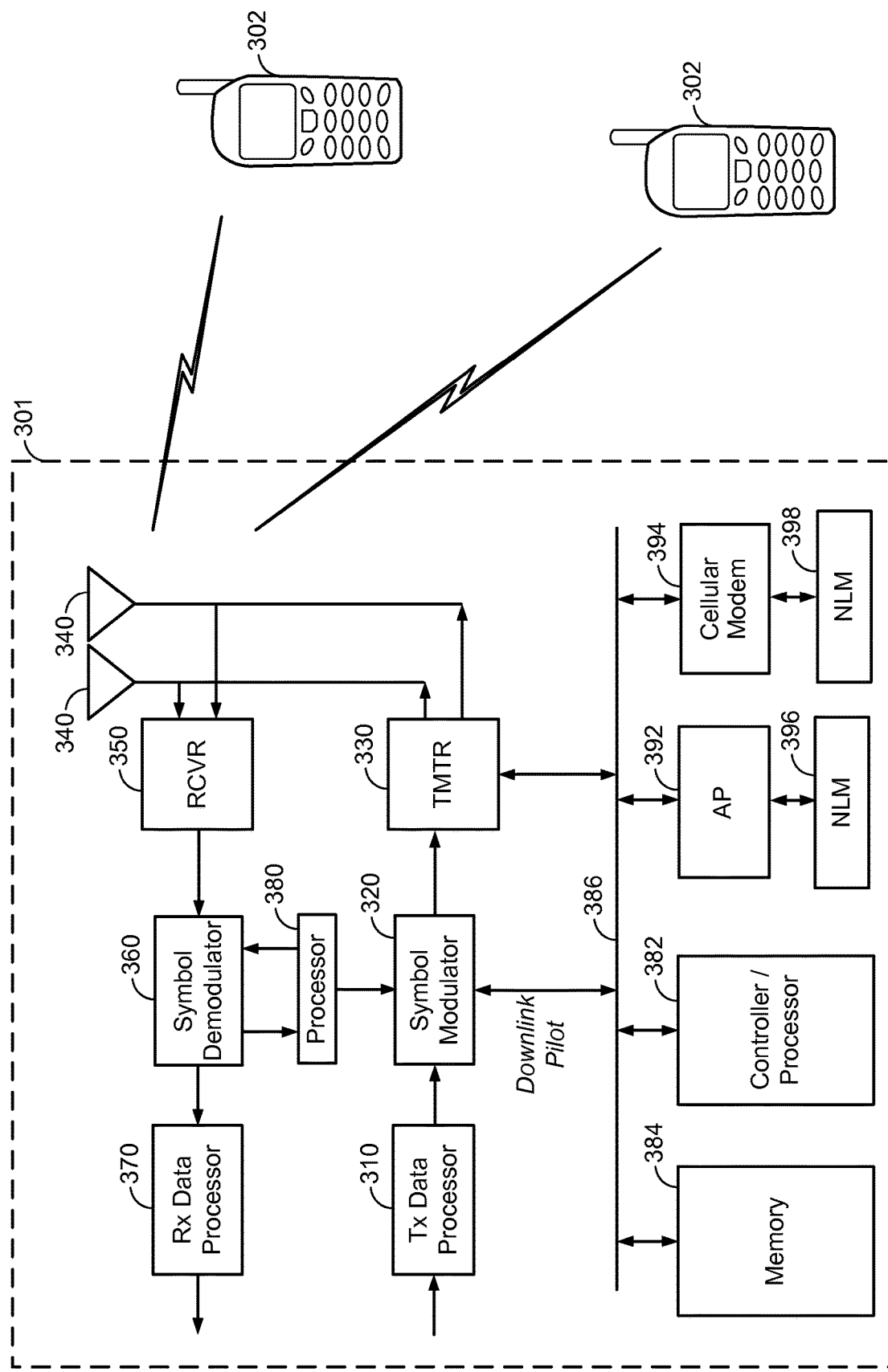
FIG. 3 illustrates an example of a small cell apparatus according to one or more aspects of the disclosure.

FIG. 3 illustrates an example of a small cell 301 according to one or more aspects of the disclosure. The small cell 301 may correspond to any of small cells 210, 212, and/or 250. While internal components of small cells can be embodied with different hardware configurations, a basic high-level configuration of internal hardware components is illustrated in FIG. 3. As shown, the small cell 301 includes a corresponding TX data processor 310, symbol modulator 320, transmitter unit (TMTR) 330, antenna(s) 340, receiver unit (RCVR) 350, symbol demodulator 360, RX data processor 370, and configuration information processor 380, performing various operations for communicating with one or more user devices 302. The small cell 301 may also include one or more general purpose controllers or processors (illustrated in the singular as the controller/processor 382) and memory 384 configured to store related data or instructions. Together, via a bus 386, these units may perform processing in accordance with the appropriate radio technology or technologies used for communication, as well as other functions for the small cell 301.

The small cell 301 may be able to provide a wireless local area network air interface (e.g., in accordance with an IEEE 802.11x protocol) as well as a cellular air interface (e.g., in accordance with an LTE protocol). As shown, in this regard the small cell 301 includes an 802.11x AP 392 co-located with a cellular modem 394. The AP 392 and the cellular modem 394 may correspond to the AP 252 and the cellular modem 254, respectively, illustrated in FIG. 2B. The AP 392 and the cellular modem 394 may perform monitoring of one or more channels (e.g., on a corresponding carrier frequency) to determine a corresponding channel quality (e.g., received signal strength) using a network listen module (NLM) or other suitable component (illustrated as NLM 396 and NLM 398, respectively). It will be appreciated that, in some designs, the functionality of one or more of these components may be integrated directly into, or otherwise performed by, the general purpose controller/processor 382 of the small cell 301, sometimes in conjunction with the memory 384.

The small cell 301 may communicate with the user devices 302 via the AP 392 and/or the cellular modem 394. It will be appreciated that a single user device 302 may be capable of communicating with the small cell 301 via both the AP 392 and the cellular modem 394, either simultaneously or at different times. In this disclosure, where a user device 302 is referred to as making and/or providing WLAN-specific measurements or performing WLAN-specific functionality, that user device 302 is understood to be connected to the AP 392. Likewise, where a user device 302 is referred to as making and/or providing cellular network-specific measurements or performing cellular network-specific functionality, that user device 302 is understood to be connected to the cellular modem 394.

In general, the AP 392 may provide its air interface (e.g., in accordance with an IEEE 802.11x protocol) over an unlicensed portion of the wireless spectrum such as an industrial, scientific, and medical (ISM) radio band, whereas the cellular modem 394 may provide its air interface (e.g., in accordance with an LTE protocol) over a licensed portion of the wireless band reserved for cellular communications. However, the cellular modem 394 may also be configured to provide cellular (e.g., LTE) connectivity over an unlicensed portion of the wireless spectrum. This type of unlicensed cellular operation may include the use of an anchor licensed carrier operating in a licensed portion of the wireless spectrum (e.g., LTE Supplemental DownLink (SDL)) and an unlicensed portion of the wireless spectrum (e.g., LTE-Unlicensed), or may be a standalone configuration operating without the use of an anchor licensed carrier (e.g., LTE Standalone).

Accordingly, aspects of the disclosure can include a small cell (e.g., small cell 301) including the ability to perform the functions described herein. As will be appreciated by those skilled in the art, the various logic elements can be embodied in discrete elements, software modules executed on a processor (e.g., controller/processor 382), or any combination of software and/or hardware to achieve the functionality disclosed herein. For example, transmitter 330, receiver 350, processor/controller 382, memory 384, NLM 396, AP 392, NLM 398, and cellular modem 394 may all be used cooperatively to load, store, and execute the various functions disclosed herein, and thus the logic to perform these functions may be distributed over various elements. Alternatively, the functionality could be incorporated into one discrete component. Therefore, the features of the small cell 301 are to be considered merely illustrative and the disclosure is not limited to the illustrated features or arrangement.

For example, the AP 392 and/or the NLM 396 may be configured to perform a channel scan of available channels, as described below with reference to 410B of FIG. 4B, for example. The processor 382 may be configured to determine whether or not there is a clean channel to be the operating channel for the cellular network based on the channel scan, as described below with reference to 415B of FIG. 4B, for example. The processor 382 may be further configured to select the clean channel as the operating channel for the cellular network based on the clean channel being available, as described below with reference to 420B of FIG. 4B, for example, or to turn off the cellular network based on no clean channel being available, as described below with reference to 450B of FIG. 4B, for example.

As another example, the cellular modem 394 and/or the NLM 398 may be configured to perform a first channel scan of available channels for operating the cellular network, as described below with reference to 510 of FIG. 5, for example. The AP 392 and/or the NLM 396 may be configured to perform a second channel scan of the available channels for operating the cellular network, as described below with reference to 410D of FIG. 4D, for example. The processor 382 may be configured to identify, based on the first channel scan, one or more cellular network channels of the available channels that have an interference level below a cellular network interference threshold, as described below with reference to 520 of FIG. 5, for example. The processor 382 may be further configured to determine, based on the second channel scan, whether or not there is a clean channel in the identified one or more cellular network channels to be the operating channel for the cellular network, as described below with reference to 415D of FIG. 4D, for example. The processor 382 may be further configured to select the clean channel as the operating channel for the cellular network based on the clean channel being available or to turn off the cellular network based on no clean channel being available, as described below with reference to 420D of FIG. 4D, for example.

From time to time, the small cell 301 may perform various radio resource management decisions within the unlicensed spectrum that require or otherwise make use of various radio resource measurements from the one or more user devices 302. The measurements may be performed by analyzing received radio signals (e.g. signal quality) and/or collecting traffic statistics (e.g. channel utilization). Conventionally, these measurements are carried over the WLAN link between the AP 392 and a given user device 302. The IEEE 802.11k revision of the IEEE 802.11 specifications, for example, provides mechanisms for radio resource measurements in IEEE 802.11 systems enabling wireless stations of a WLAN to automatically adjust to their radio environment. A wireless station can make measurements locally as well as request measurements from other wireless stations with whom the wireless station has an association allowing direct radio communication. In this way, for example, the AP 392 can request radio resource measurements from another wireless station (e.g., one of the user devices 302) within the same Basic Service Set (BSS) and vice versa. This signaling scheme requires, however, a standalone wireless station to be associated with the AP 392 in the small cell 301, which is not guaranteed.

The small cell 301 may establish a cellular network, such as an LTE/LTE Advanced network in unlicensed spectrum, in addition to a WLAN, provided there is a "clean" channel available on which to establish the cellular network. The small cell 301 may determine whether or not a clean channel is available using measurements gathered by the AP 392, in addition to, or instead of, measurements that the cellular modem 394 would otherwise gather itself. The AP 392 can provide these measurements to the cellular modem 394 using the controller/processor 382 and/or the bus 386. The measurements may come from the NLM 396 and/or the user devices 302. By only establishing a cellular network on a clean channel, the cellular network's interference with the WLAN is mitigated.

Figure 4A:
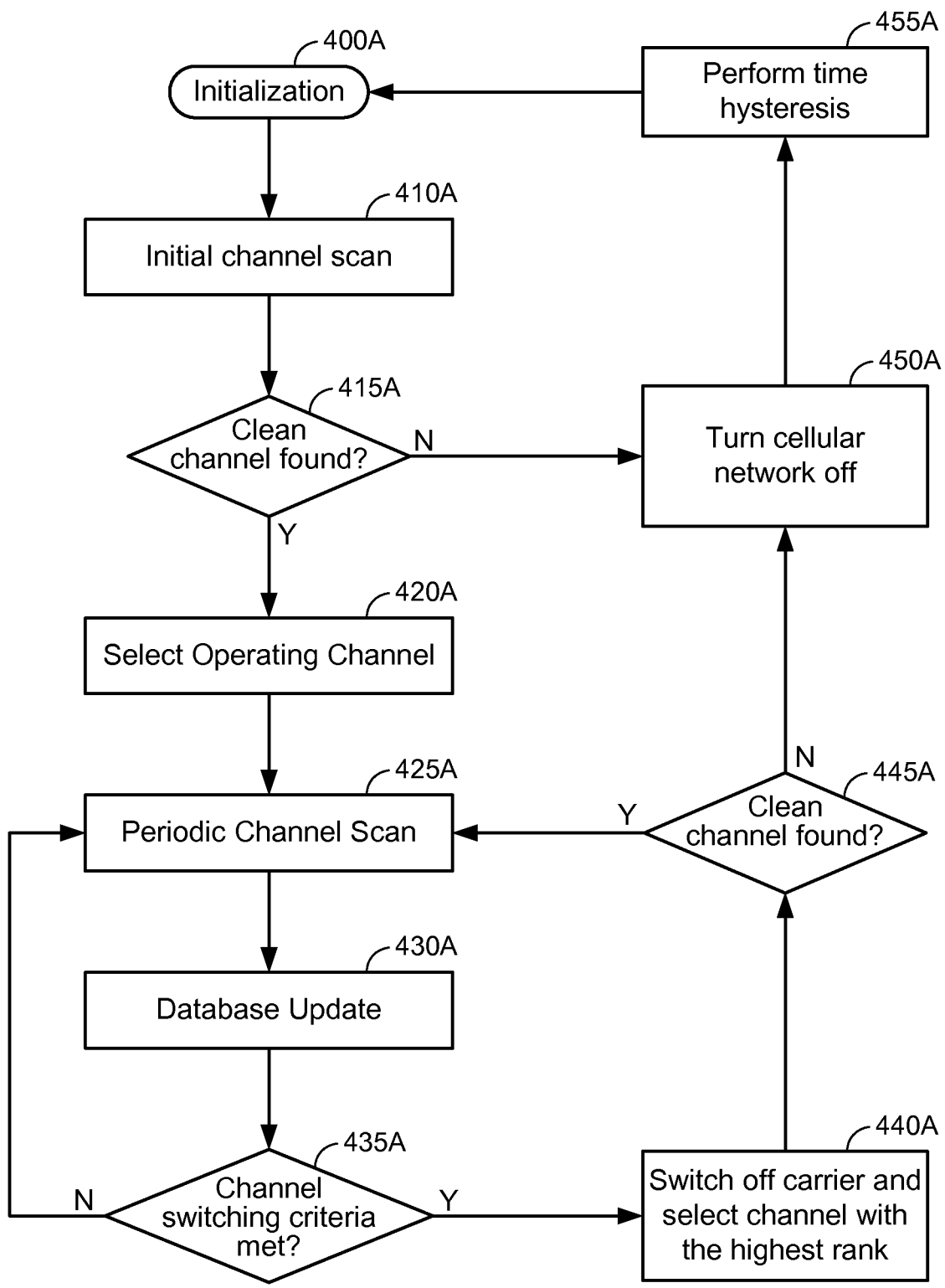
FIG. 4A illustrates an exemplary flow for cellular network channel selection to reduce interference to a wireless local area network (WLAN) according to at least one aspect of the disclosure.

FIG. 4A illustrates an exemplary flow for cellular network channel selection to reduce interference to a WLAN according to at least one aspect of the disclosure. The cellular network may be, for example, an LTE Advanced network in unlicensed spectrum. The flow illustrated in FIG. 4A may be performed by the small cell 301 in FIG. 3. As used herein, a cellular network "channel" identifies a corresponding carrier frequency, or cellular network signal.

The flow begins at 400A. At 410A, the small cell 301 performs an initial channel scan of WLAN channels.

At 415A, the small cell 301 determines whether or not there is a clean channel. If there are no clean channels, then the flow proceeds to 450A, where the small cell 301 turns off, or does not establish, the cellular network. If, however, there are one or more clean channels, then at 420A, the small cell 301 selects an operating channel for the cellular network from among the clean channels.

At 425A, the small cell 301 performs a periodic channel scan. At 430A, the small cell 301 updates a channel database of available channels.

At 435A, the small cell 301 determines whether or not channel switching criteria have been met. If the channel switching criteria have not been met, then the flow returns to 425A, where the small cell 301 continues performing periodic scans. If, however, the channel switching criteria have been met, then the flow proceeds to 440A. At 440A, the small cell 301 switches off the current carrier and selects the channel with the highest rank as the new operating channel for the cellular network.

At 445A, the small cell 301 determines whether or not a clean channel was found. If a clean channel was found, then the small cell 301 switches to the new clean channel and the flow returns to 425A, where the small cell 301 continues performing periodic scans, this time on the new clean channel. If a clean channel was not found, then at 450A, the small cell 301 turns off the cellular network and provides only the WLAN. At 455A, the small cell 301 performs some time hysteresis and the flow returns to 400A.

Figure 4B:
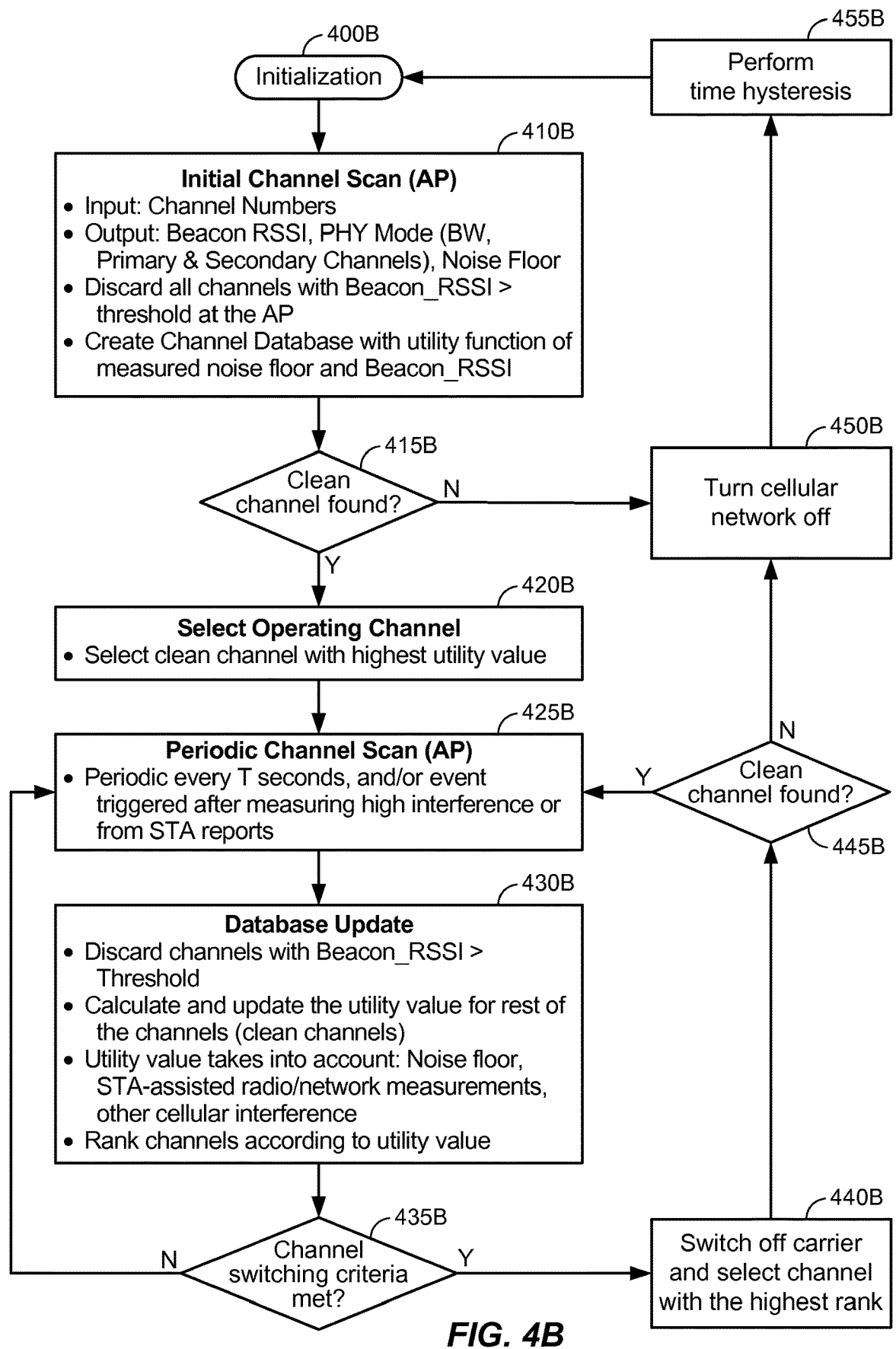
FIG. 4B illustrates an exemplary flow for cellular network channel selection to reduce interference to a WLAN according to at least one aspect of the disclosure.

FIG. 4B illustrates an exemplary flow for cellular network channel selection to reduce interference to a WLAN according to at least one aspect of the disclosure. The cellular network may be, for example, an LTE Advanced network in unlicensed spectrum. The flow illustrated in FIG. 4B may be performed by the small cell 301 in FIG. 3.

The flow begins at 400B. At 410B, the small cell 301 performs an initial channel scan of available channels. More specifically, the AP 392, using the NLM 396, may perform the initial channel scan. An available channel may be a channel on which the small cell 301 can establish the cellular network. However, the small cell 301 may also be capable of establishing a WLAN on such a channel. That is, the small cell 301 may be capable of establishing a WLAN or a cellular network on the same channel.

The NLM 396 receives as input, from the AP 392, the channel numbers of all available channels and outputs, to the AP 392, the received signal strength indicator (RSSI) of the channel beacon, the physical layer (PHY) mode (which may include the bandwidth and the primary and secondary channels), and the noise floor of each channel. A PHY module in the NLM 396 detects the WLAN beacon, the bandwidth of WLAN operation, and the location of the WLAN channel, if greater than a threshold (e.g., 20 MHz).

The AP 392 ignores all channels with a beacon RSSI greater than an RSSI threshold, as measured at the AP 392. The RSSI threshold is an adjustable dBm level chosen such that if the interference from the cellular network is at that dBm level, the performance degradation to the WLAN is acceptable. If the RSSI threshold is increased, the interference and the performance degradation will be higher, but there may be more channels meeting that threshold. If the RSSI threshold is decreased, the interference and the performance degradation will be decreased, but there may be fewer channels meeting that threshold.

The small cell 301 then creates a channel database of the channels meeting the RSSI threshold using a utility function of the measured noise floor and the beacon RSSI of the channel. The utility function is a function that takes the beacon RSSI, which indicates the strength of the interference, and the noise floor already existing without interference and generates a utility value/metric that reflects the system performance for that channel. Thus, the channel with the maximum utility value is the channel with the maximum performance. Choosing the channel with a higher utility value means choosing the channel that decreases interference. As an example, the utility value could be the inverse of the absolute interference.

At 415B, the AP 392 determines whether or not there is a clean channel. A clean channel is a channel with a maximum beacon RSSI, as measured at the AP 392, less than the RSSI threshold. If there are no clean channels, then the flow proceeds to 450B, where the small cell 301 turns off, or does not establish, the cellular network.

If, however, there are one or more clean channels, then at 420B, the AP 392 selects as the operating channel for the cellular network the clean channel with the highest utility value, as determined by the utility function based on the measured noise floor and the beacon RSSI.

At 425B, the AP 392 performs a periodic channel scan. The AP 392 can perform the scan every T seconds and/or upon some event trigger. A triggering event may be, for example, measuring a high interference to the current operating channel at the AP 392 or receiving an indication of a high interference from an STA report (received from a user device 302 connected to the AP 392).

The periodic scan may detect whether or not new nearby AP(s) have started transmitting on the current operating channel. The AP 392 makes periodic measurements on the operating channel every T seconds. The choice of T impacts the latency to react to a new nearby AP and interruption to operation of both the cellular network and the WLAN in the small cell 301. Lower duty cycle scans can be performed on the other channels.

More specifically, the AP 392 may perform two different scans according to two different duty cycles. The AP 392 may make intra-frequency measurements according to a first duty cycle (e.g., every T seconds, as described above), and inter-frequency measurements according to a second duty cycle. That is, the AP 392 can scan the operating channel according to the first duty cycle, and can scan all other channels according to the second duty cycle. Alternatively, the AP 392 may only scan the other clean channels. The second duty cycle may be less frequent than the first duty cycle. Both duty cycles may be relatively long, for example, measured in seconds or even minutes.

The channel scan can also be triggered if strong interference is detected, as discussed above. For example, the scan could be triggered based on uplink or downlink packet error rate (PER) metrics and/or channel quality indicator (CQI) reports from user devices 302 connected to the cellular network, which could be due to a new nearby WLAN AP. Performing a scan if strong interference is detected helps reduce latency to react to a new WLAN AP. The thresholds should be selected to reduce false alarms and minimize ongoing cellular network/WLAN traffic interruption.

The AP 392 may collect STA-assisted measurements, such as 802.11k measurements, from user devices 302 that are connected to the small cell 301 via the AP 392. This can occur more frequently than collecting measurements from the NLM 396. The STA-assisted measurements are used to update the utility value of the clean channel(s), and can trigger the AP 392 to perform a channel scan. To optimize the performance of the cellular network, the STA-assisted measurements can be complemented with cellular network measurements, such as radio resource measurements (RRM) and CQI reports, from user devices 302.

At 430B, the small cell 301 updates the channel database discussed above. The small cell 301 discards any channels with a beacon RSSI greater than the RSSI threshold. This can be based on only the WLAN AP scan. The STA reports play a role in determining the cleanest channel among this list of clean channels (i.e., channels with a beacon RSSI less than or equal to the RSSI threshold). The small cell 301 then calculates or updates the utility value (as calculated by the utility function discussed above) for the rest of the channels (i.e., the clean channels). The utility value takes into account the noise floor, the STA-assisted measurements, and/or any other cellular network interference. The small cell 301 then ranks the clean channels according to their utility values.

At 435B, the small cell 301 determines whether or not channel switching criteria have been met. The channel switching criteria may include an indication of whether or not the beacon RSSI of a new beacon is greater than the RSSI threshold, as measured at the AP 392, with some hysteresis and timing conditions. The criteria also include an indication of whether there is a new channel with a higher utility value than the current operating channel, again with some hysteresis and timing conditions.

The hysteresis and timing conditions are used to prevent the cellular modem 394 from bouncing between operating channels. For example, the small cell 301 may set a timer indicating how long the cellular modem 394 has been using the current operating channel. If the timer has not expired, the cellular modem 394 is not permitted to switch to the new operating channel. However, if the channel performance is especially poor, this timer can be ignored to allow the switching to happen faster.

If the channel switching criteria have not been met, then the flow returns to 425B, where the AP 392 continues performing periodic scans. If, however, the channel switching criteria have been met, then the flow proceeds to 440B. At 440B, the small cell 301 switches off the carrier channel and selects the channel with the highest rank (i.e., the highest utility value).

At 445B, the AP 392 determines whether or not a clean channel was found in 440B. If a clean channel was found and the AP 392 switched to the new clean channel at 440B, then the flow returns to 425B, where the AP 392 continues performing periodic scans, this time on the new clean channel. If a clean channel was not found, however, then at 450B, the small cell 301 turns off the cellular network and simply provides the WLAN.

Turning off the cellular network and switching to the WLAN is the fallback solution if there is no clean channel on which to establish the cellular network. For the baseline solution, the small cell 301 switches off the cellular network and the co-located AP 392 can start providing the WLAN on that channel instead. The user devices 302 can go to Radio Link Failure (RLF), meaning they will attempt connection re-establishment on another cellular network operating on a different frequency. Radio Resource Control (RRC) Connection Release can also be used to gracefully move out connected mode user devices in the system.

The small cell 301 can handoff active user devices to a neighboring cell before switching off the cellular network. Idle user devices simply perform cell selection when coming out of idle mode. Note that the channel utility function and channel selection are based on measurements from the AP 392 and/or the STA-assisted measurements. In contrast, turning off the cellular network is only based on the AP 392 measurements.

At 455B, the small cell 301 performs some time hysteresis and the flow returns to 400B. Specifically, since no clean channel was found and the cellular network was turned off, or not established, after some period of time, the flow then returns to 400B to search again in an attempt to establish, or re-establish, the cellular network.

The following is a specific example of performing the initialization using the NLM 396 and the AP 392. First, the AP 392 collects AP measurements on all channels from the NLM 396. The AP 392 measures the beacon RSSI on different channels, for example, beacon_$RSSI_{i,j}$, where i is the channel index and j is the beacon index. The AP 392 also measures the RSSI on different channels, taking into account all sources of interference including other cellular networks, for example, $RSSI_i$, where i is the channel index.

Next, the AP 392 discards channel i with a maximum$_j$ (beacon_$RSSI_{i,j}$) greater than the RSSI threshold. Discarded channels can be scanned again after some time hysteresis, as discussed above.

Next, the AP 392 computes an RSSI metric for the remaining clean channels, for example, Init_Metric$_i$=$\alpha_1$RSSI$_i$+$\alpha$2$\Sigma_{j \in \beta}$ beacon_$RSSI_{i,j}$. Among channels with a metric below Init_Metric$_{threshold}$, the AP 392 can randomly pick an operating channel for the cellular network. The AP 392 can bias this channel selection based on maximum transmission power requirements. This network listen can be repeated periodically or triggered by STA-assisted measurements.

Note, for a BSS with a bandwidth greater than 20 MHz (as indicated from High Throughput (HT) and Very High Throughput (VHT) Operation IE fields in the beacon), the AP 392 can apply the beacon RSSI to all secondary channels. The AP 392 can also add a back off amount to the beacon_$RSSI_i$, when applied to secondary channels.

The STA reports (i.e., the STA-assisted measurements) discussed above can include a calculated channel penalty. The small cell 301 forms a database of STA beacon reports for each channel i. The small cell 301 can keep the newest Max_database reports and discards older reports to maintain a maximum database size. The small cell 301 can use, for example, the 802.11k beacon reports.

With each unique measurement, the small cell 301 can update each channel penalty metric $P_i$ for channel i using all database entries k according to the formula $P_i = \Sigma_k q_{i,k}$, where, if no beacon is detected, then $q_{i,k}=0$, and if the beacon has an RSSI less than an RSSI_threshold, then $q_{i,k}$=penalty_low, and if the beacon has an RSSI greater than the RSSI_threshold, then $q_{i,k}$=penalty_high. This measures the percent coverage area with some desense due to AP interference. That is, the user devices 302 are in different locations in the coverage area and each sees some level of interference, indicated by $q_{i,k}$. When the different q values of all user devices 302 on a given channel are summed, it indicates how good the coverage area for this channel is in terms of interference. For example, if the penalty is high, it means that in different places in the coverage area, there is high interference, and vice versa.

A unique measurement means a new data point significantly different from the earlier data point from that same user device 302. For example, if there is at least X dBm RSSI difference between any beacon commonly reported in both reports, or if there is a new beacon with an RSSI above a threshold Y dBm, or if there is an old beacon with an RSSI above a threshold Z dBm that did not get detected, then the new data point may be considered to be significantly different from the earlier data point.

RRM measurements from user devices 302 can be taken into consideration to reduce inter-operator interference and pilot pollution. The channel penalty can also take into account these RRM measurements. The user devices 302 can report intra- and inter-frequency Reference Signal Received Power (RSRP) measurements of neighboring cells, which indicate how strong the desired signal is. These reports indicate whether the neighboring cell belongs to the same small cell operator or a different small cell operator in unlicensed spectrum (through Automatic Neighborhood Relations (ANR), which is a mechanism in LTE to discover neighbor cells and can be used for the same or different operators).

The channel penalty can be updated as described above. For each unique measurement, the small cell 301 can update each channel penalty metric $P_i$ for channel i using all database entries k using the formula $P_i = \Sigma_k w_{i,k}$. If no nearby small cell is detected, then $w_{i,k}=0$. If the RSRP is less than an RSRP threshold, then $w_{i,k}$=penalty_low_1/penalty_low_2 (for the same/different operator). If the RSRP is greater than the RSRP threshold, then $w_{i,k}$=penalty_high_1/penalty_high_2 (for the same/different operator). Different operators (e.g., different operators in unlicensed spectrum) will have a higher penalty than the penalty that the operator of the small cell 301 will have.

The AP 392 can periodically update the channel penalty metric on all channels using the STA reports and network listen provided by the NLM 396. If a channel is clean for more than some number of seconds, e.g., T, the channel is eligible to carry the cellular network.

Referring back to the channel switching criteria discussed above with reference to 435B of FIG. 4B, if a new beacon RSSI, as measured at the AP 392, exceeds the RSSI threshold and some hysteresis for some timer period, then the AP 392 can switch to the next clean channel with the lowest penalty (highest utility). If there are a sufficient number of measurement reports available (e.g., a minimum database size), then the AP 392 can change the operating channel to j if $P_{j \neq i}$ is less than $P_i$ minus the hysteresis and the $RSSI_j$ measured at the AP 392 is below some threshold RSSI_UL. This condition should be met consistently for a certain duration of time or across a certain number of new measurement reports. If multiple channels satisfy this criterion, the AP 392 can use RSRP/RSRQ (Reference Signal Received Quality, which is an indicator of the Signal to Interference plus Noise Ratio (SINR) of the signal) related metrics to decide.

Referring back to the channel switching procedure discussed above with reference to 440B of FIG. 4B, the anchor carrier can de-activate user devices configured on the SDL. This stops the user devices from monitoring the Common Reference Signal (CRS), which is the pilot signal in LTE, on the SDL and sending CQI and RRM measurements. This can be accomplished through an RRC configuration message or Medium Access Control (MAC) control element.

Next, the small cell 301 can switch off the SDL and switch on a new SDL on a different channel, if a clean channel (i.e., a channel with a maximum beacon RSSI less than the RSSI threshold) for the cellular network is available. The user devices 302 can then be activated on the new channel via an RRC configuration message.

Note that in general, unlicensed Secondary Carrier Components (SCCs) should be barred so that user devices 302 do not camp on it.

The time scale for channel switching should be larger than the rate control and the other interference management (e.g., Fractional Frequency Reuse (FFR), which is an interference coordination mechanism between different small cells) of the other cellular network small cells on unlicensed carriers.

An issue with the flow illustrated in FIGS. 4B/4C is that small cells operating in the unlicensed band, such as small cell 301, may not necessarily be synchronized to one another (especially if, for example, they belong to different operators). Even if small cells having the same operator are time synchronized, their actual AP scan times can still be offset from one another.

Since every small cell chooses a scan duration and periodicity for its AP scan and operates in an independent manner, there are situations where the small cell's co-located AP may perform an AP scan at the same time that other small cells are transmitting. This can cause undue interference at the co-located AP, thereby reducing its sensitivity to detect existing and new neighboring APs.

For example, small cell 301 may have previously received (and decoded) a neighboring AP signal at −80 dBm, after which a new small cell may begin transmitting on this channel. If the new small cell is sufficiently close and is received at above −80 dBm, for example, its AP beacon becomes un-decodable. This causes the small cell 301's co-located AP 392 to think that this neighboring AP/WLAN is no longer present and that the channel has become cleaner, while in reality it has not. Further, the small cell 301 will not be able to discover new WLANs with similar signal strengths during the scan because of interference from other unlicensed cellular network air interfaces, such as LTE/LTE Advanced in unlicensed spectrum.

To mitigate this AP misdetection issue in the presence of interference from other small cells operating in LTE/LTE Advanced in unlicensed spectrum, small cell 301 can leverage its co-located NLM 396/398 for LTE/LTE Advanced in unlicensed spectrum measurements and use it to appropriately filter AP scan reports. First, the small cell 301 avoids channels with a strong presence in the LTE/LTE Advanced in unlicensed spectrum. Among the remaining weak channels in the LTE/LTE Advanced in unlicensed spectrum, assuming that at least one is available, the small cell 301 uses the WLAN threshold to determine clean/unclean channels. If a subset of the channels has a strong presence in the LTE/LTE Advanced in unlicensed spectrum, the small cell 301 "freezes" the channel database or uses Successive Interference Cancellation (SIC) to detect the beacons on those channels.

Figure 4C:
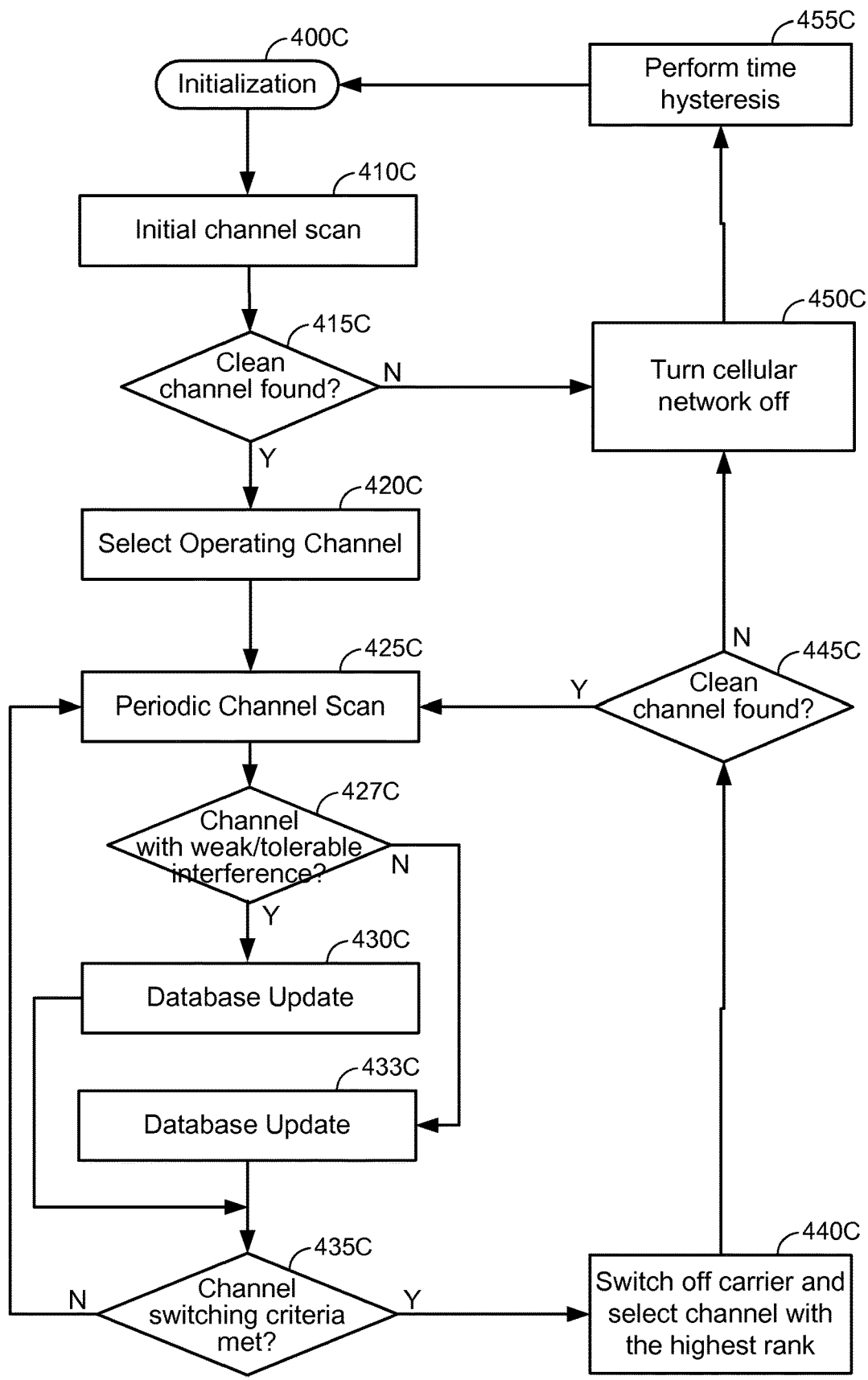
FIG. 4C illustrates an exemplary flow for cellular network channel selection to reduce interference to a WLAN according to at least one aspect of the disclosure.

FIG. 4C illustrates a high-level flow of an exemplary method for cellular network channel selection to reduce interference to a WLAN according to at least one aspect of the disclosure. The cellular network may be, for example, an LTE Advanced network in unlicensed spectrum. The flow illustrated in FIG. 4C may be performed by the small cell 301 in FIG. 3. As used herein, a cellular network "channel" identifies a corresponding carrier frequency, or cellular network signal.

The flow begins at 400C. At 405C, the small cell 301, specifically both the AP 392 and the cellular modem 394, performs an initial channel scan of available channels.

At 415C, the small cell 301 determines whether or not there is a clean channel. If there are no clean channels, then the flow proceeds to 450C, where the small cell 301 turns off, or does not establish, the cellular network. If, however, there are one or more clean channels, then at 420C, the small cell 301 selects an operating channel for the cellular network from among the clean channels.

At 425C, the small cell 301, specifically both the AP 392 and the cellular modem 394, performs a periodic channel scan. At 427C, the small cell 301 determines whether or not there is at least one channel with weak or tolerable cellular interference based on the channel scan performed by the cellular modem 394. If there is at least one channel with weak/tolerable cellular interference, then at 430C, the small cell 301 updates a channel database of available channels as described above with reference to 430B of FIG. 4B. Otherwise, at 433C, the small cell 301 updates a channel database of available channels as described below with reference to 530-560 of FIG. 5 and 660B-675B and 645B of FIG. 6B.

At 435C, the small cell 301 determines whether or not channel switching criteria have been met. If the channel switching criteria have not been met, then the flow returns to 425C, where the small cell 301 continues performing periodic channel scans. If, however, the channel switching criteria have been met, then the flow proceeds to 440C. At 440C, the small cell 301 switches off the current carrier and selects the channel with the highest rank as the new operating channel for the cellular network.

At 445C, the small cell 301 determines whether or not a clean channel was found. If a clean channel was found, then the small cell 301 switches to the new clean channel and the flow returns to 425C, where the small cell 301 continues performing periodic scans, this time on the new clean channel. If a clean channel was not found, then at 450C, the small cell 301 turns off the cellular network and provides only the WLAN. At 455C, the small cell 301 performs some time hysteresis and the flow returns to 400A.

Figure 4D:
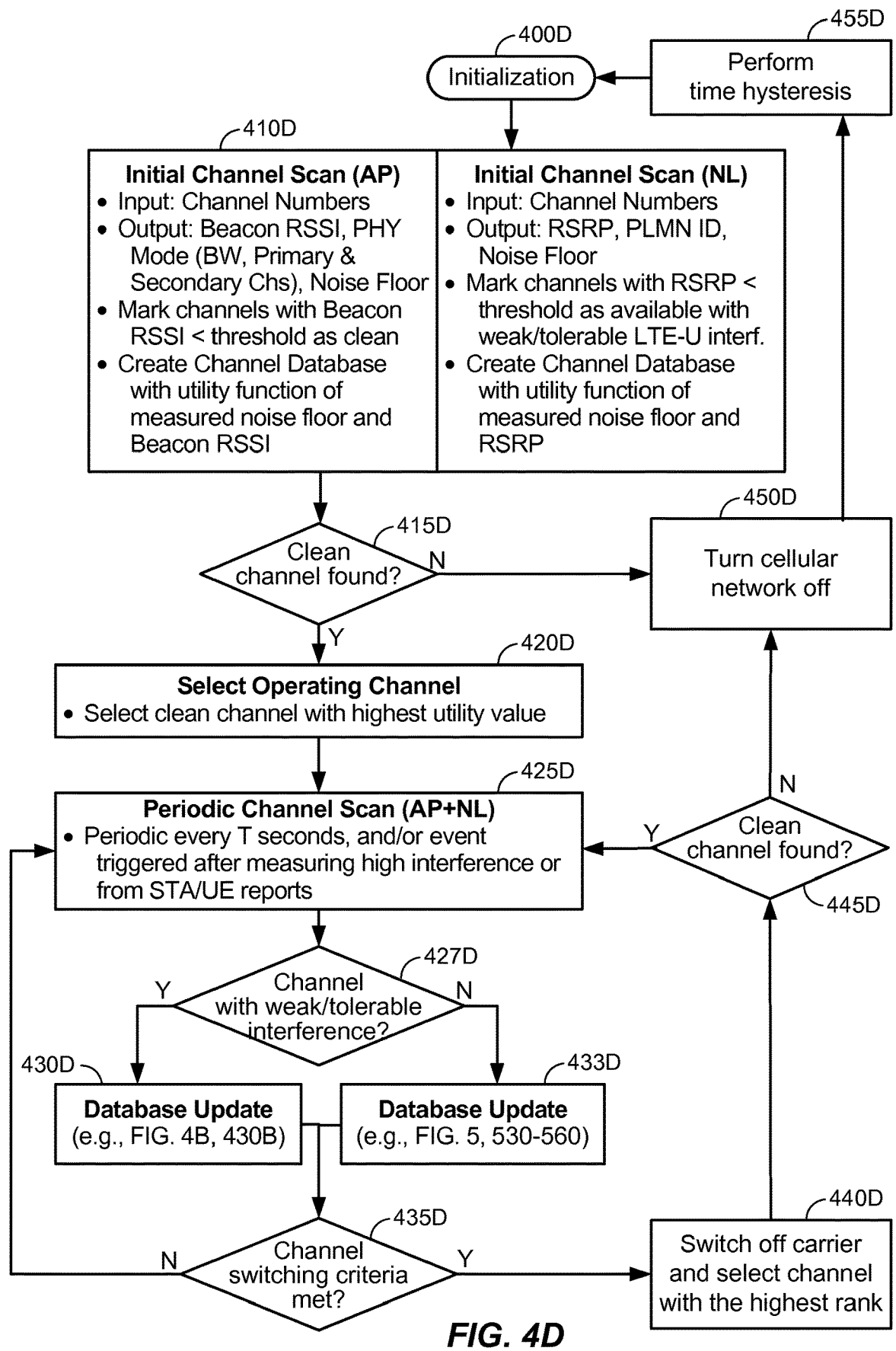
FIG. 4D illustrates an exemplary flow for cellular network channel selection to reduce interference to a WLAN according to at least one aspect of the disclosure.

FIG. 4D illustrates the flow of FIG. 4C in greater detail. As with FIG. 4C, the flow illustrated in FIG. 4D may be performed by the small cell 301 in FIG. 3.

The flow begins at 400D. At 410D, the small cell 301, specifically the cellular modem 394 using the NLM 398, performs an initial channel scan of available channels (referred to in FIG. 4D as "Initial Channel Scan (NL)"), as discussed below with reference to 510 of FIG. 5. The cellular modem 394 receives as input the channel numbers of all available channels and outputs the RSRP, PLMN ID, and noise floor of each channel. Channels with an RSRP less than a threshold at the cellular modem 394 are marked as available with weak/tolerable interference in the LTE Advanced in unlicensed spectrum. The small cell 301 creates a channel database with a utility function for each channel of the measured noise floor and the RSRP.

Also at 410D, the small cell 301, specifically the AP 392, performs an initial channel scan. The AP 392 receives as input the channel numbers of all available channels and outputs the RSSI of the channel beacon, the PHY mode (which may include the bandwidth and the primary and secondary channels), and the noise floor of each channel. Channels with a beacon RSSI less than a threshold at the AP 392 are marked as clean. The small cell 301 creates a channel database with a utility function for each channel of the measured noise floor and the beacon RSSI, as described above with reference to 410B of FIG. 4B. Note that the channel database created at 410D may be a different database than the database created at 405D, or the information detected at 410D may be added to the database created at 405D.

At 415D, the small cell 301 determines whether or not there is a clean channel. As discussed above with reference to 415B of FIG. 4B, a clean channel is a channel with a maximum beacon RSSI, as measured at the AP 392, less than the RSSI threshold. If there are no clean channels, then the flow proceeds to 450D, where the small cell 301 turns off, or does not establish, the cellular network.

If, however, there are one or more clean channels, then at 420D, the AP 392 selects as the operating channel for the cellular network the clean channel with the highest utility value, as determined by the utility function based on the measured noise floor and the beacon RSSI.

At 425D, the AP 392 and the cellular modem 394 perform periodic channel scans. The AP 392 and the cellular modem 394 can perform the scans every T seconds and/or upon some event trigger. A triggering event may be, for example, measuring a high interference to the current operating channel at the AP 392 or the cellular modem 394 or receiving an indication of a high interference from an STA or UE report (received from a user device 302 connected to the AP 392 and/or the cellular modem 394).

At 427D, the small cell 301 determines whether or not there is at least one channel with weak/tolerable cellular (e.g., LTE Advanced in unlicensed spectrum) interference based on the initial/periodic NL scan at 410D and 425D, as discussed below with reference to 520 of FIG. 5. If at least one such channel is available, then at 430D, the small cell 301 updates the channel database created during the AP scan at 410D, as discussed above with reference to 430B of FIG. 4B. The small cell 301 marks channels as clean or unclean. If all available channels have strong (i.e., not weak/tolerable) interference in the LTE/LTE Advanced in unlicensed spectrum, the flow proceeds to 433D, where the small cell 301 can perform the procedure in 530-560 of FIG. 5 or 660B-675B and 645B of FIG. 6B, as discussed below. As part of the database updates, the small cell 301 calculates or updates the utility value (as calculated by the utility function discussed above) for the list of channels. The utility value takes into account the noise floor, the STA-assisted measurements, and/or any other cellular network interference. The small cell 301 then ranks the clean channels according to their utility values.

The flow then proceeds to 435D, 440D, 445D, 450D, and 455D, which correspond to 435B, 440B, 445B, 450B, and 455B of FIG. 4B, respectively. For brevity, the discussion of these features is not repeated here.

Figure 5:
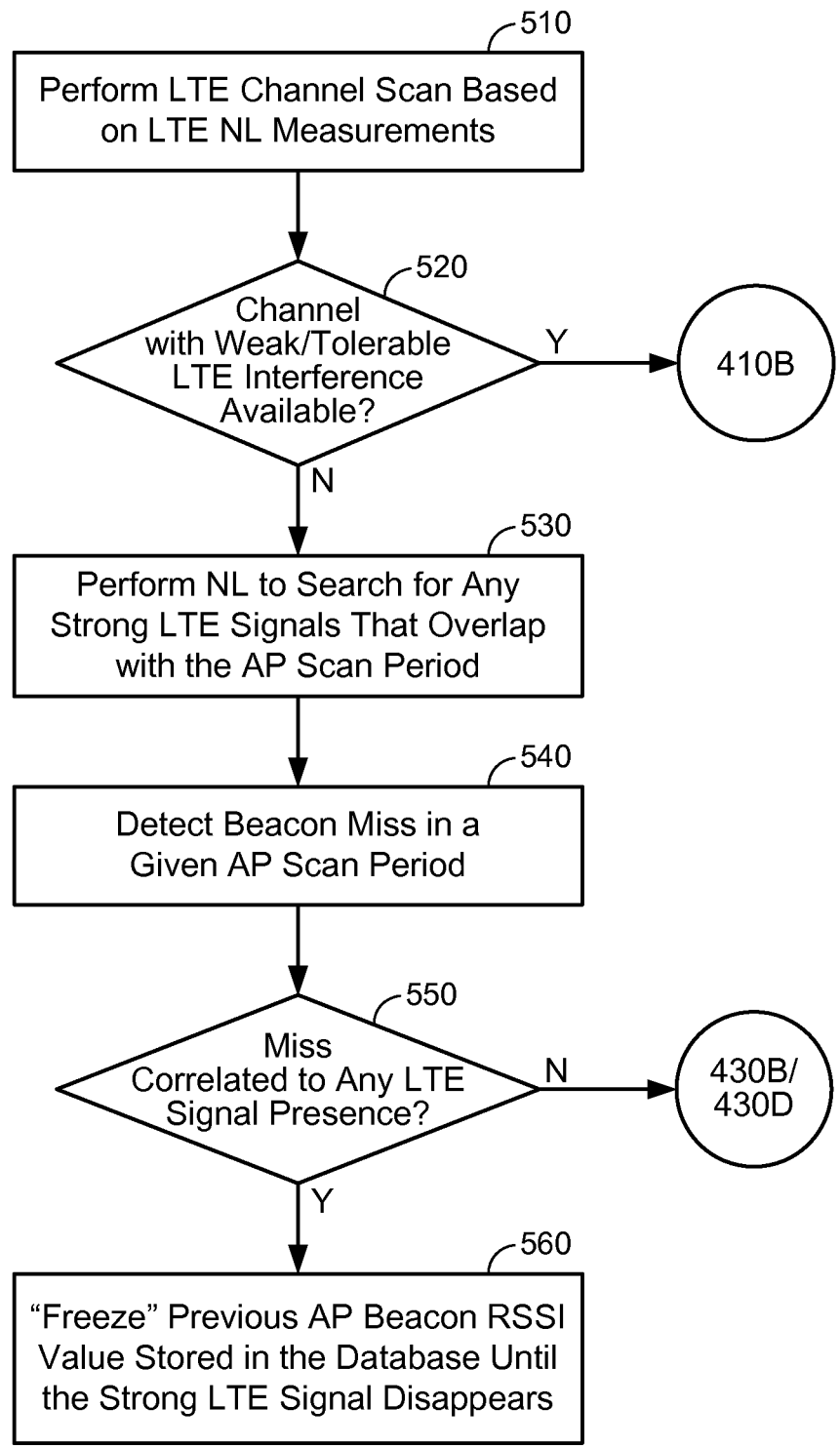
FIG. 5 illustrates an exemplary flow for minimizing WLAN access point misdetection for Long Term Evolution (LTE)/LTE Advanced in unlicensed spectrum channel selection in the presence of interference.

FIG. 5 illustrates an exemplary flow for minimizing WLAN AP misdetection for LTE/LTE Advanced in unlicensed spectrum channel selection in the presence of interference. The flow illustrated in FIG. 5 may be performed by the small cell 301 in FIG. 3. The flow illustrated in FIG. 5 may occur in conjunction with aspects of the flows illustrated in FIGS. 4B/4D.

Before performing WLAN measurements on all channels and choosing the cleanest channel, as in 410B/410D and 420B/420D of FIGS. 4B/4D, at 510, the small cell 301 (specifically the cellular modem 394) can perform LTE/LTE Advanced in unlicensed spectrum channel scanning based on LTE/LTE Advanced in unlicensed spectrum network listen measurements from the NLM 398, and then choose a set of channels with weak or tolerable interference in the LTE/LTE Advanced in unlicensed spectrum. The interference may be from other operators' small cells operating in the LTE/LTE Advanced in unlicensed spectrum. A "weak" or "tolerable" interference may be, for example, a Cell Edge RSRP equal to −120 dBm, or an RSSI (assuming full loading) equal to −120 plus 30, or −90 dBm. By choosing a set of channels with a weak or tolerable interference in the LTE/LTE Advanced in unlicensed spectrum, the small cell 301/cellular modem 394 is avoiding channels with a strong presence in the LTE/LTE Advanced in unlicensed spectrum.

The small cell 301 (specifically the AP 392) can then choose channels based on the received signal strength from the same or other operator small cells and the clean channel WLAN threshold, as discussed above with reference to 410B/410D and 420B/420D of FIGS. 4B/4D. Specifically, the small cell 301/AP 392 performs the scan illustrated in 410B/410D of the channels with weak/tolerable cellular interference identified in 510/520.

When choosing the channels, the small cell 301 can give different priorities to channels being used by the same operator (i.e., the operator of small cell 301), different operators (i.e., operators different from the operator of small cell 301), and WLAN. The small cell 301 can prioritize the same/different operators and WLAN channels using the channel penalty described above.

If, at 520, a channel with weak or tolerable interference in the LTE/LTE Advanced in unlicensed spectrum is available, then there is no need to change the flow of FIG. 4B/4D, since any WLAN AP beacons above the threshold can be decoded reliably. They can be decoded reliably because the NLM 398 identified that there is no interference in the LTE/LTE Advanced in unlicensed spectrum above this pre-defined signal level.

If, however, at 520, such a "weak" or "tolerable" channel in the LTE/LTE Advanced in unlicensed spectrum is not available, the small cell 301 can leverage the presence of strong interference in the LTE/LTE Advanced in unlicensed spectrum to filter out unavailable channels. The channel scanning flow illustrated in FIG. 4B has a simple infinite impulse response (IIR) filter to average the beacon RSSI values obtained as a result of the WLAN AP scan. This simple filtering can be modified to account for detection in the presence of strong interference in the LTE/LTE Advanced in unlicensed spectrum.

Specifically, at 530, during the duration of the periodic WLAN AP scan (425D of FIG. 4D), the co-located cellular modem 394 can also perform a periodic network listen (425D of FIG. 4D) to search for any strong LTE/LTE Advanced in unlicensed spectrum signals that overlap with the WLAN AP scan period. That way, a sudden beacon miss on a given channel in a given WLAN AP scan period (detected at 540) can be correlated to the appearance of a strong LTE/LTE Advanced in unlicensed spectrum signal (from the NLM 398) on that channel.

Given that a WLAN AP is usually static, a sudden beacon miss can be interpreted as a beacon that had been reported periodically during the "non-busy" hours but suddenly goes missing. If, at 550, such an event occurs, then at 560, the previous WLAN AP beacon RSSI value stored in the database for that channel is "frozen" until the strong LTE/LTE Advanced in unlicensed spectrum signal disappears. The small cell 301 then continues the periodic scanning of the remaining channels.

If, however, the miss is uncorrelated to any LTE/LTE Advanced in unlicensed spectrum signal presence, indicating that the WLAN AP on that channel is possibly shut OFF, then the beacon RSSI is aged as before, and the small cell 301 continues the periodic scanning of the remaining channels. The flow then proceeds to 430B/430D of FIG. 4B/4D and the database is updated with any new information discovered during the scanning. Note that while FIGS. 4A-4D illustrate the database update as being performed after the periodic channel scan, as is apparent, the database may be updated during the channel scan. That is, the entry for each channel may be updated (or not in the case of a "freeze") based on the measurements of that channel made during the channel scan.

A more advanced LTE/LTE Advanced in unlicensed spectrum channel selection, for example, SIC, can actually use the co-located cellular modem 394 to store, decode, reconstruct, and cancel the LTE/LTE Advanced in unlicensed spectrum interference (e.g., primary synchronization signal (PSS), secondary synchronization signal (SSS), paging channel (PCH), Cell-specific Reference Signal (CRS), data channels, etc.) from the received waveform during the WLAN AP scan period and provide the "cleaned" residual waveform for WLAN detection to the co-located AP 392 at 425B of FIG. 4B. The small cell 301 can implement SIC using a shared memory, or the AP 392 can perform SIC.

The user device, such as user device 302, could also use SIC when it collects 802.11k reports as part of the flow illustrated in FIG. 4B. The user device can cancel residual LTE/LTE Advanced in unlicensed spectrum interference and then perform WLAN detection to increase the probability of detecting an AP.

Finally, among small cells that belong to the same operator, the times of the periodic WLAN AP scans at 425B of FIG. 4B can be synchronized based on agreed upon times for performing the scans and/or signaling over the X2 or backhaul. At these synchronized measurement gaps, the small cells can mute together and allow their co-located WLAN APs to learn the WLAN environment around them. The pre-agreed times may be based on, for example, an absolute clock, such as a GPS or a network time protocol (NTP) clock.

Figure 6A:
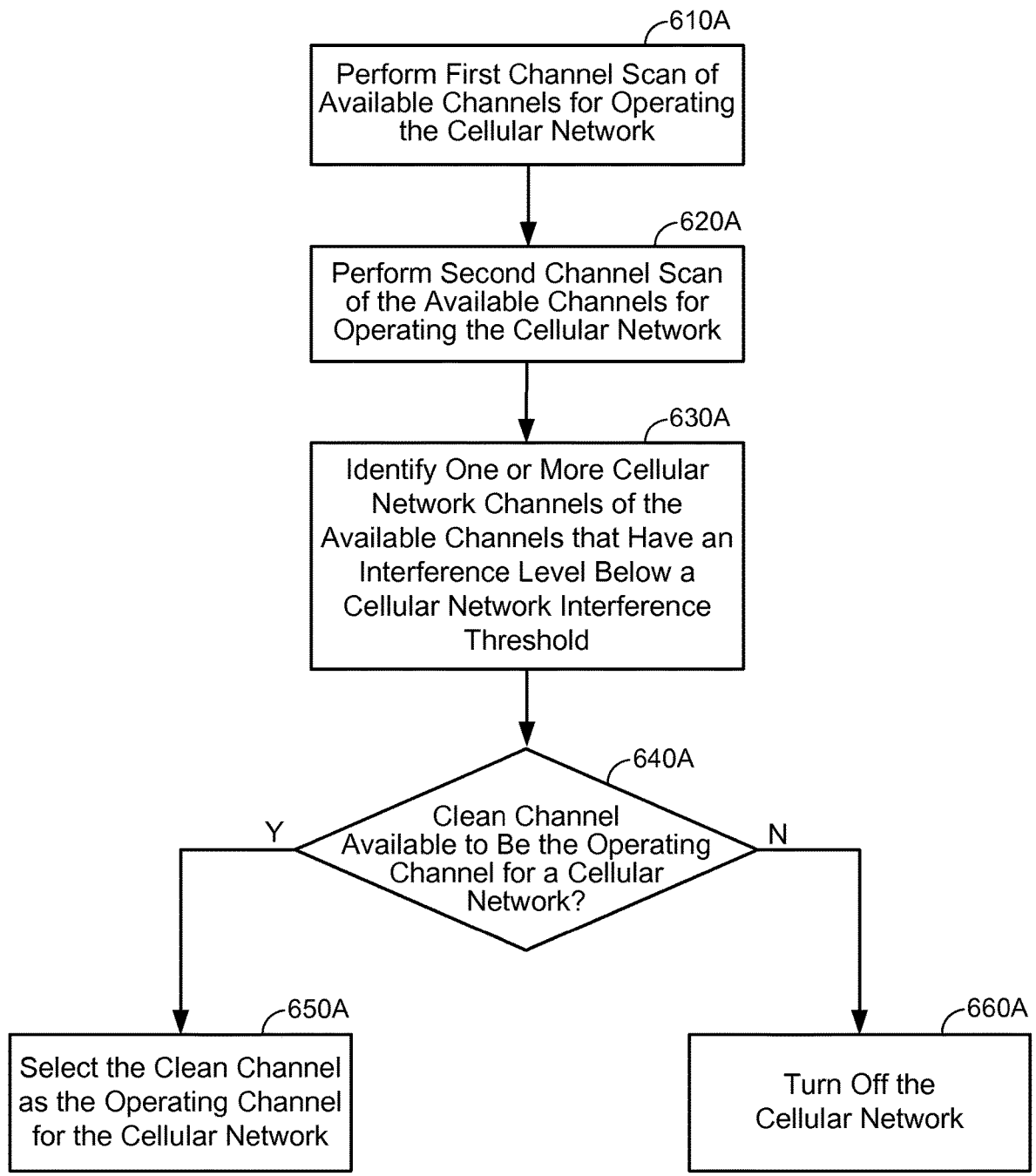
FIG. 6A illustrates an exemplary flow for cellular network channel selection to reduce interference to a WLAN according to at least one aspect of the disclosure.

FIG. 6A illustrates an exemplary flow for selecting an operating channel for a cellular network to reduce interference to a WLAN operated by a small cell, such as small cell 301 in FIG. 3. The cellular network may be an LTE network in unlicensed spectrum. The flow illustrated in FIG. 6A may be performed by the small cell 301 in FIG. 3. As illustrated in FIG. 3, the small cell 301 may include a WLAN AP, such as AP 392, and a cellular network modem, such as cellular modem 394.

At 610A, the small cell 301 performs a first channel scan of available channels for operating the cellular network, as at 510 of FIG. 5. The cellular network channels may be LTE channels in unlicensed spectrum.

At 620A, the small cell 301 performs a second channel scan of the available channels, as at 410B/410D of FIGS. 4B/4D. At 630A, the small cell 301 identifies, based on the first channel scan, one or more cellular network channels of the available channels that have an interference level below a cellular network interference threshold, as at 520 of FIG. 5. At 640A, the small cell 301 determines, based on the second channel scan, whether or not a clean channel is available to be the operating channel for the cellular network, as at 415B/415D of FIGS. 4B/4D. As described above, a clean channel may be a channel that interferes with the WLAN less than a threshold.

At 650A, the small cell 301 may select the clean channel as the operating channel for the cellular network, as at 420B/420D of FIGS. 4B/4D. Alternatively, at 660A, the small cell 301 may turn off the cellular network based on a clean channel not being available, as at 450B/450C of FIGS. 4B/4C.

Figure 6B:
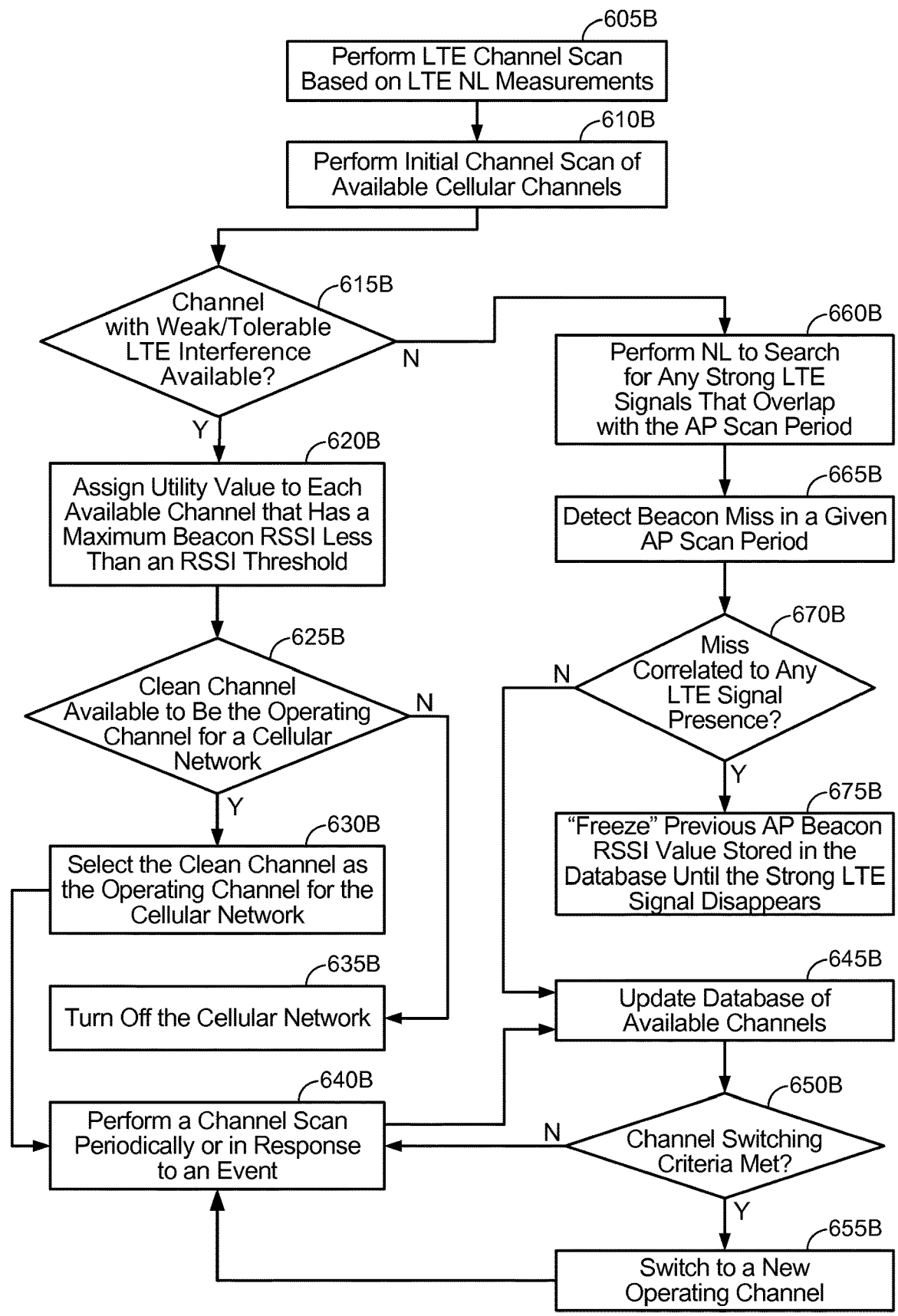
FIG. 6B illustrates an exemplary flow for cellular network channel selection to reduce interference to a WLAN according to at least one aspect of the disclosure.

FIG. 6B illustrates an exemplary flow for selecting an operating channel for a cellular network to reduce interference to a WLAN operated by a small cell, such as small cell 301 in FIG. 3. The cellular network may be an LTE Advanced network in unlicensed spectrum. The flow illustrated in FIG. 6B may be performed by the small cell 301 in FIG. 3. As illustrated in FIG. 3, the small cell 301 may include a WLAN access point, such as AP 392, and a cellular network modem, such as cellular modem 394.

At 605B, the small cell 301, specifically the cellular modem 394/NLM 398, performs a channel scan of available cellular network channels, such as at 410D of FIG. 4D or 510 of FIG. 5. The cellular network channels may be LTE channels in unlicensed spectrum. This channel scan is performed primarily to avoid channels in the LTE/LTE Advanced in unlicensed spectrum being used by other operators. The order of priority in avoiding channels is: channels being used by other operators for LTE/LTE Advanced networks in unlicensed spectrum, channels being used for WLANs, channels being used by the same operator for LTE/LTE Advanced networks in unlicensed spectrum.

At 610B, the small cell 301, specifically the AP 392/NLM 394, performs an initial channel scan of available channels, such as at 410B/410D of FIGS. 4B/4D.

At 615B, the small cell determines whether there are one or more cellular network channels with an interference level below a cellular network interference threshold available, such as at 520 of FIG. 5. The cellular network channel(s) may be LTE Advanced channel(s) in unlicensed spectrum. The threshold may be an RSRP threshold, as described above.

At 620B, the small cell 301 assigns a utility value to each available channel that has a maximum beacon RSSI less than the RSSI threshold, such as at 410B/410D of FIGS. 4B/4D. The utility value may be based on a noise floor and the maximum beacon RSSI. Note that although 615B is illustrated as occurring before 620B, 620B may occur before 615B.

At 625B, the small cell 301 determines whether or not a clean channel is available to be the operating channel for the cellular network based on the initial channel scan, such as at 415B/415D of FIGS. 4B/4D. As described above, a clean channel may be a channel that interferes with the WLAN less than a threshold. A clean channel may be a channel with a maximum beacon RSSI less than an RSSI threshold.

At 630B, the small cell 301 may select a clean channel as the operating channel for the cellular network based on a clean channel being available, such as at 420B/420D of FIGS. 4B/4D. The selected operating channel may be an available channel with the highest utility value. Alternatively, at 635B, the small cell 301 may turn off the cellular network based on a clean channel not being available, such as at 450B/450D of FIGS. 4B/4D.

At 640B, the small cell 301 performs a channel scan periodically or in response to an event, such as at 425B/D of FIGS. 4B/4D. As an example, the event may be the detection, by the WLAN AP or a user device connected to the WLAN AP, of interference on the operating channel higher than a threshold.

At 645B, the small cell 301 updates a database of available channels, such as at 430B/430D of FIGS. 4B/4D.

At 650B, the small cell 301 determines whether or not channel switching criteria for switching to a new operating channel based on the periodic channel scan have been met, such as at 435B/435D of FIGS. 4B/4D. As described above, the channel switching criteria may include an indication of whether or not a beacon RSSI of a new beacon is greater than the threshold and/or an indication of whether there is a new channel with a higher utility value than the operating channel.

At 655B, the small cell switches to the new operating channel based on determining that the channel switching criteria have been met, such as at 440B/440D of FIGS. 4B/4D. Otherwise, if the channel switching criteria have not been met, the flow returns to 640B.

Referring back to 610B, if there are no cellular network channels with an interference level below the cellular network interference threshold, then at 660B, the small cell 301 performs a network listen to search for any cellular network signals with an interference level above the cellular network interference threshold that overlap with a scan period of the WLAN AP, such as at 530 of FIG. 5.

At 665B, the small cell 301 detects an access point beacon miss in a given scan period of the WLAN AP, such as at 540 of FIG. 5.

At 670B, the small cell 301 determines whether the access point beacon miss is correlated to a presence of a cellular network signal, such as at 550 of FIG. 5.

At 675B, based on the access point beacon miss being correlated to a presence of a cellular network signal, the small cell 301 maintains, or "freezes," a previous access point beacon RSSI for the cellular network channel corresponding to the cellular network signal until the interference level is not above the cellular network interference threshold, such as at 560 of FIG. 5. Otherwise, if the miss is not correlated to a presence of a cellular network signal, the flow proceeds to 645B.

Alternatively, rather than performing the flow of blocks 660B-675B, the small cell 301 can perform successive interference cancellation (SIC) on a cellular network signal with an interference level above the cellular network interference threshold to generate a clean cellular network signal, as described above. The small cell 3013 can then provide the clean cellular network signal to the WLAN AP. The clean cellular network signal may be a waveform that does not include the cellular network signal with the interference level above the cellular network interference threshold and contains only residual WLAN AP signals for beacon detection. In an aspect, the SIC and the providing may be performed by a user device in communication with the small cell 301, such as user device 302. Alternatively, the SIC and the providing may be performed by the small cell 301.

As another alternative, channel scans of available WLAN access point channels can be synchronized among a plurality of small cells, including small cell 301, belonging to the same operator. In this case, the small cell 301 can be muted to permit the WLAN AP to determine a current wireless environment of the small cell.

Figure 7:
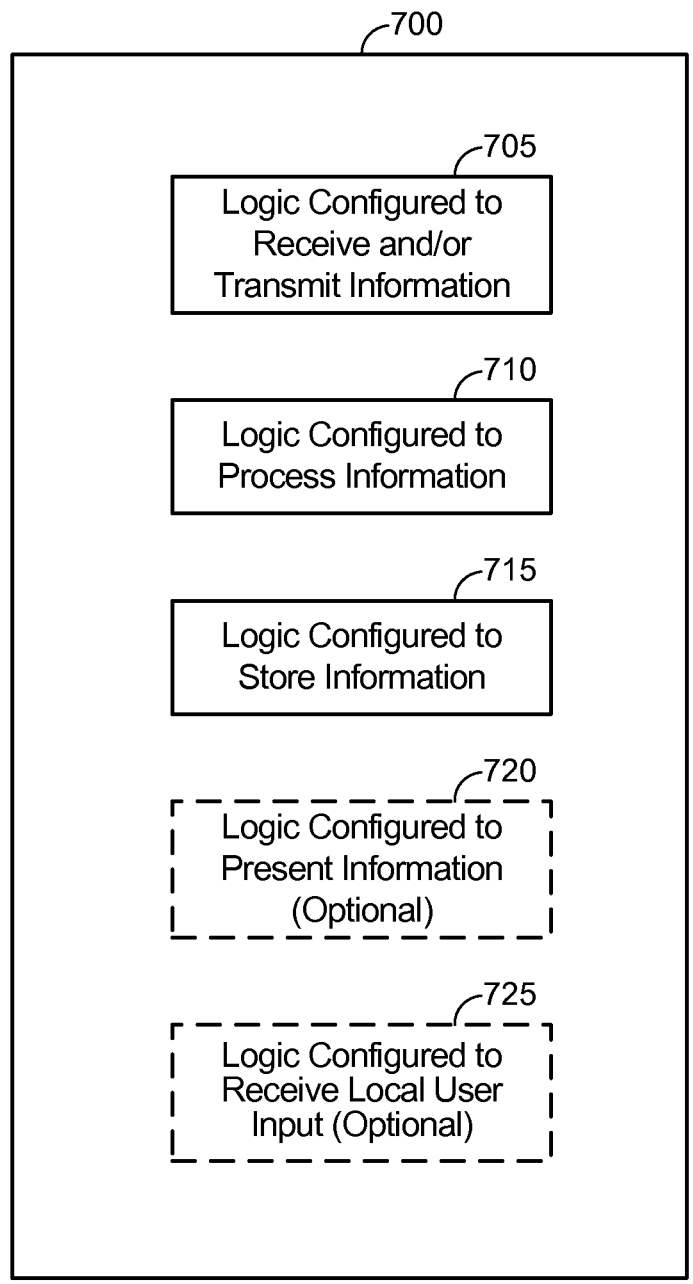
FIG. 7 illustrates a communication device that includes logic configured to perform functionality in accordance with an aspect of the disclosure.

FIG. 7 illustrates a communication device 700 that includes logic configured to perform functionality. The communication device 700 can correspond to any of the above-noted communication devices, including but not limited to any component of the wireless communication network 100, any component of the mixed communication network environment 200, the small cell 301, the user devices 302, and so on.

Referring to FIG. 7, the communication device 700 includes logic configured to receive and/or transmit information 705. In an example, if the communication device 700 corresponds to a wireless communications device (e.g., the small cell 301 or the user devices 302), the logic configured to receive and/or transmit information 705 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In an aspect, if the communication device 700 corresponds to the small cell 301 in FIG. 3, the logic configured to receive and/or transmit information 705 can include, for example, antennas 340, transmitter 330, receiver 350, NLM 396, AP 392, NLM 398, and/or cellular modem 394. In another example, the logic configured to receive and/or transmit information 705 can correspond to a wired communications interface (e.g., a serial connection, a USB or Firewire connection, an Ethernet connection through which the Internet can be accessed, etc.). Thus, if the communication device 700 corresponds to some type of network-based server (e.g., an application server), the logic configured to receive and/or transmit information 705 can correspond to an Ethernet card, in an example, that connects the network-based server to other communication entities via an Ethernet protocol. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the processor included in the logic configured to process information 710 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In an aspect, if the communication device 700 corresponds to the small cell 301 in FIG. 3, the logic configured to process information 710 can include, for example, TX data processor 310, RX data processor 370, processor 380, and/or controller/processor 382. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to RAM, flash memory, ROM, erasable programmable ROM (EPROM), EEPROM, registers, hard disk, a removable disk, a CD-ROM, or any other form of storage medium known in the art. In an aspect, if the communication device 700 corresponds to the small cell 301 in FIG. 3, the logic configured to store information 715 can include, for example, memory 384. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to present information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. The logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 700. The logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 715. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 8:
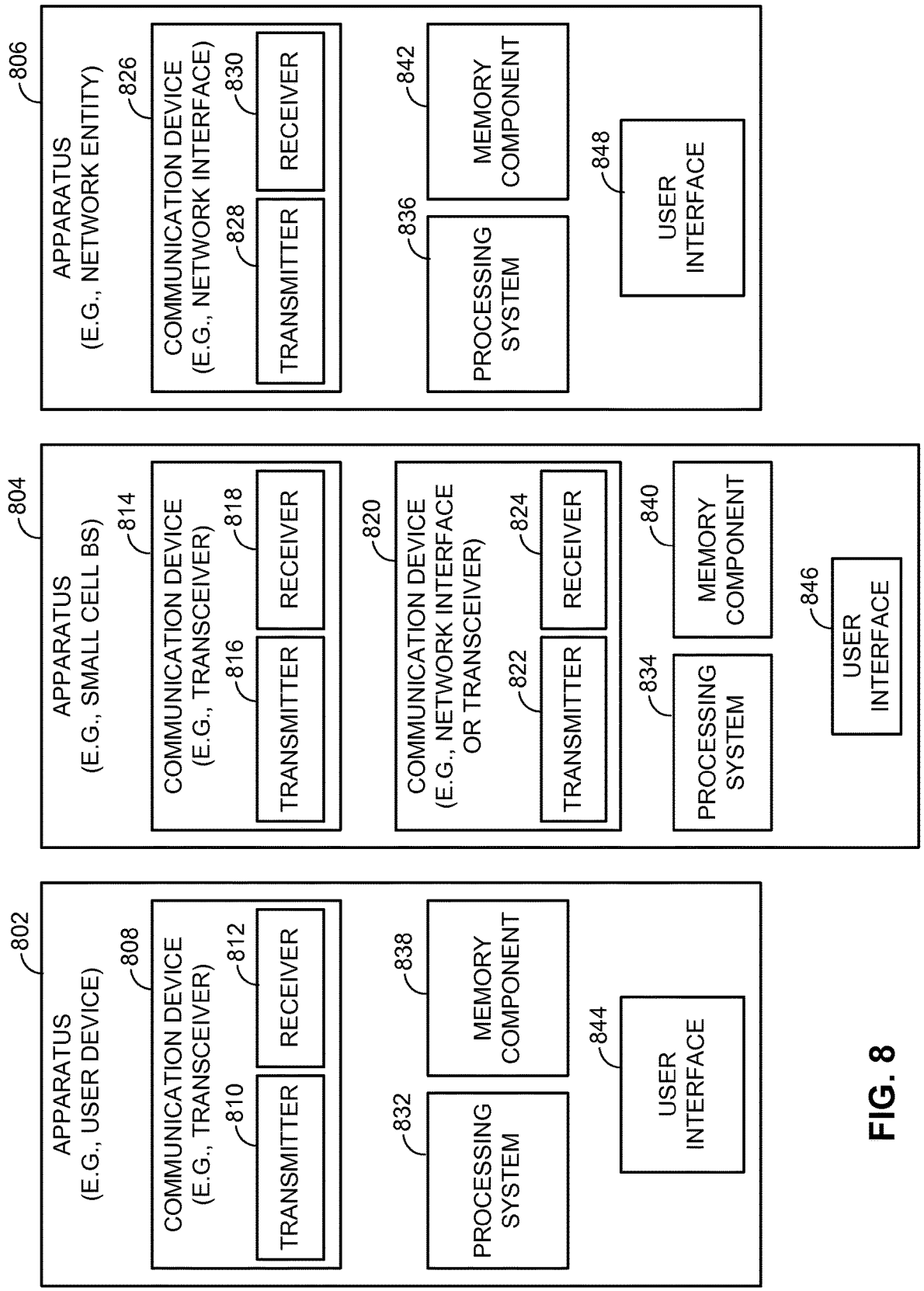
FIG. 8 is a simplified block diagram of several sample aspects of components that may be employed in communication nodes and configured to support communication as taught herein.

FIG. 8 illustrates several sample components (represented by corresponding blocks) that may be incorporated into an apparatus 802, an apparatus 804, and an apparatus 806 (corresponding to, for example, a user device, a small cell base station, and a network entity, respectively) to support the selection of an operating channel for a cellular network so as to reduce interference to a WLAN as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814 (and the communication device 820 if the apparatus 804 is a relay)) for communicating with other nodes via at least one designated RAT. Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on). If the apparatus 804 is a relay station, each communication device 820 may include at least one transmitter (represented by the transmitter 822) for transmitting signals (e.g., messages, indications, information, pilots, and so on) and at least one receiver (represented by the receiver 824) for receiving signals (e.g., messages, indications, information, and so on). A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 804 may also comprise a Network Listen Module (NLM) or the like for performing various measurements.

The apparatus 806 (and the apparatus 804 if it is not a relay station) includes at least one communication device (represented by the communication device 826 and, optionally, 820) for communicating with other nodes. For example, the communication device 826 may comprise a network interface that is configured to communicate with one or more network entities via a wire-based or wireless backhaul. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, if the apparatus 804 is not a relay station, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with the operations of selecting an operating channel for a cellular network so as to reduce interference to a WLAN as taught herein. The apparatus 802 includes a processing system 832 for providing functionality relating to, for example, STA and UE reports as taught herein and for providing other processing functionality. The apparatus 804 includes a processing system 834 for providing functionality relating to, for example, selecting an operating channel for a cellular network so as to reduce interference to a WLAN as taught herein and for providing other processing functionality. The apparatus 806 includes a processing system 836 for providing functionality relating to, for example, network operations to support the selection of an operating channel for a cellular network so as to reduce interference to a WLAN as taught herein and for providing other processing functionality. The apparatuses 802, 804, and 806 include memory components 838, 840, and 842 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatuses 802, 804, and/or 806 are shown in FIG. 8 as including various components that may be configured according to the various examples described herein. It will be appreciated, however, that the illustrated blocks may have different functionality in different designs.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or by appropriate configuration of processor components).

Figure 9:
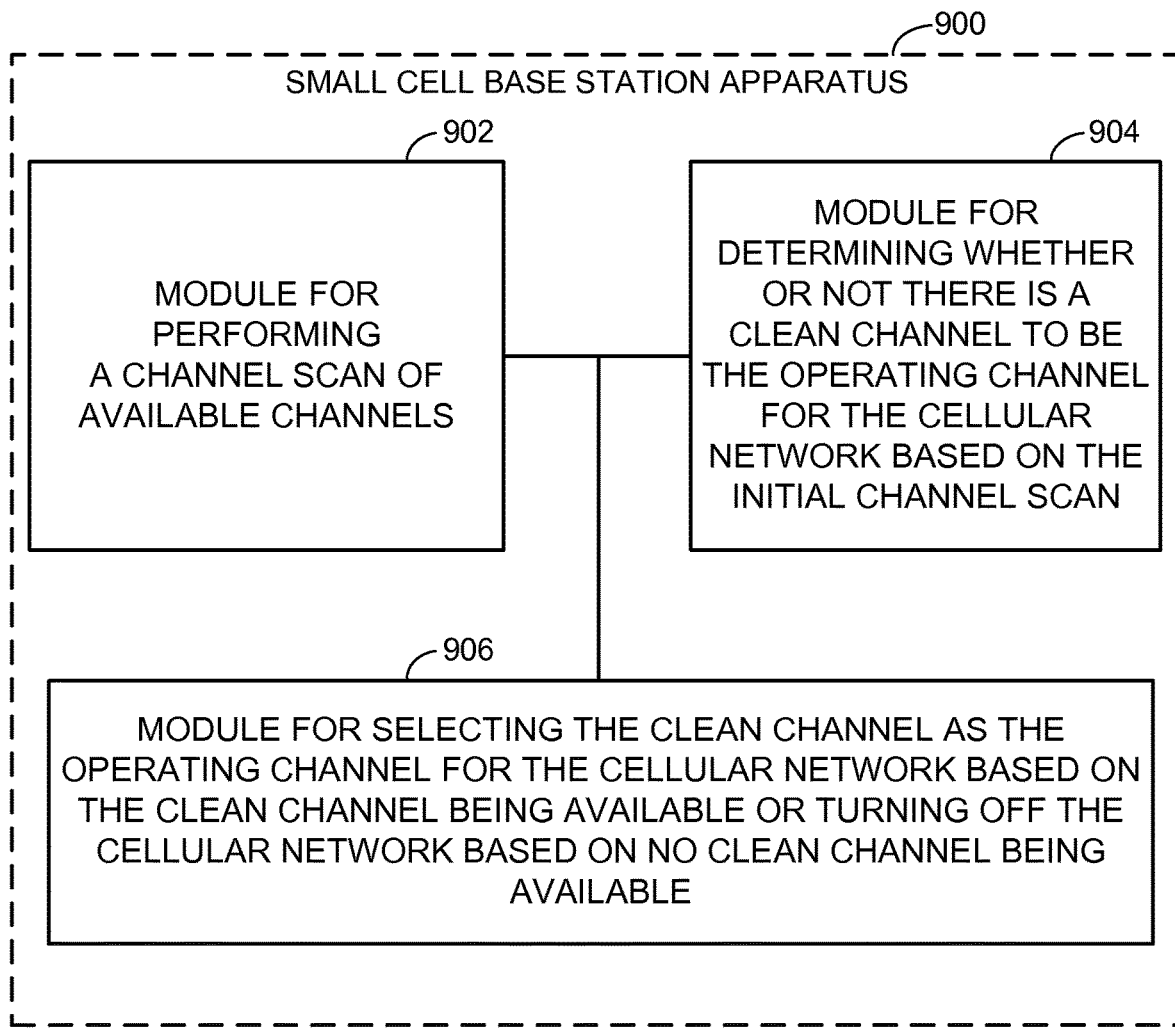
FIGS. 9-10 are other simplified block diagrams of several sample aspects of apparatuses configured to support communication as taught herein.

FIG. 9 illustrates an example base station apparatus 900 represented as a series of interrelated functional modules. A module for performing a channel scan of available channels 902 may correspond at least in some aspects to, for example, a WLAN access point and/or corresponding NLM, such as AP 392 and/or NLM 396 in FIG. 3, as discussed herein. A module for determining whether or not there is a clean channel to be the operating channel for the cellular network based on the channel scan 904 may correspond at least in some aspects to, for example, a processing system, such as processor 382 in FIG. 3, as discussed herein. A module for selecting the clean channel as the operating channel for the cellular network or turning off the cellular network based on no clean channel being available 906 may correspond at least in some aspects to, for example, a processing system, such as processor 382 in FIG. 3, as discussed herein.

Figure 10:
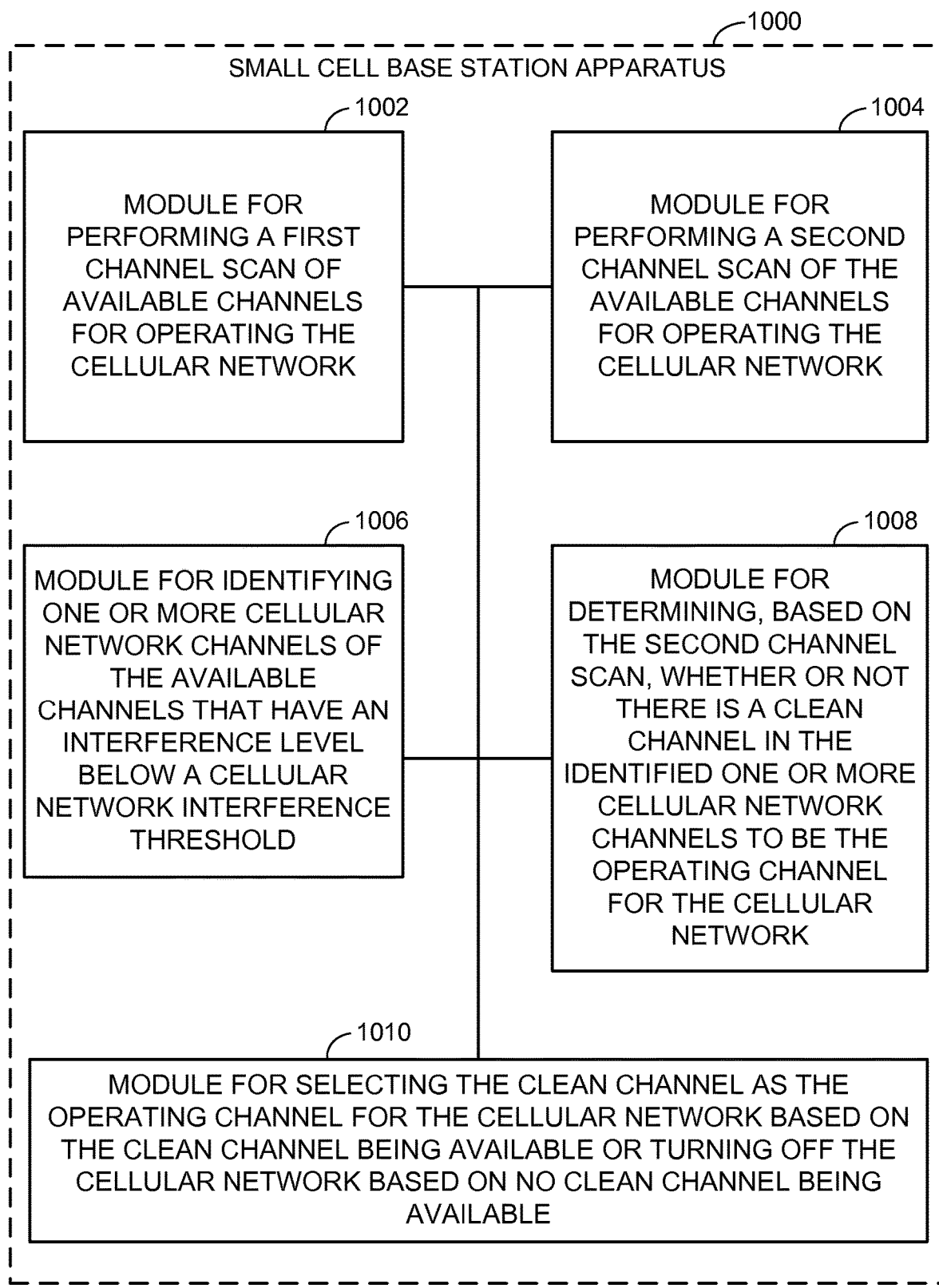

FIG. 10 illustrates an example user device apparatus 1000 represented as a series of interrelated functional modules. A module for performing a first channel scan of available channels for operating the cellular network 1002 may correspond at least in some aspects to, for example, a cellular modem and/or corresponding NLM, such as cellular modem 394 and/or NLM 398 in FIG. 3, as discussed herein. A module for performing a second channel scan of the available channels for operating the cellular network 1004 may correspond at least in some aspects to, for example, a WLAN access point and/or corresponding NLM, such as AP 392 and/or NLM 396 in FIG. 3, as discussed herein. A module for identifying, based on the first channel scan, one or more cellular network channels of the available channels that have an interference level below a cellular network interference threshold 1006 may correspond at least in some aspects to, for example, a processing system, such as processor 382 in FIG. 3, as discussed herein. A module for determining, based on the second channel scan, whether or not there is a clean channel in the identified one or more cellular network channels to be the operating channel for the cellular network 1008 may correspond at least in some aspects to, for example, a processing system, such as processor 382 in FIG. 3, as discussed herein. A module for selecting the clean channel as the operating channel for the cellular network based on the clean channel being available or turning off the cellular network based on no clean channel being available 1010 may correspond at least in some aspects to, for example, a processing system, such as processor 382 in FIG. 3, as discussed herein.

The functionality of the modules of FIGS. 9-10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-10, as well as other components and functions described herein, may be implemented using any suitable means. Such means also may be implemented, at least in part, using corresponding structure as taught herein. For example, the components described above in conjunction with the "module for" components of FIGS. 9-10 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for channel selection to reduce interference to a wireless local area network from a cellular network. Accordingly, the disclosure is not limited to illustrated examples and any means for performing the functionality described herein are included in aspects of the disclosure.

While the foregoing shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for selecting an operating channel for a cellular network to reduce interference to a wireless local area network (WLAN) operated by a small cell base station, comprising:

performing, by a WLAN access point of the small cell base station, a channel scan of available channels, the small cell comprising the WLAN access point and a cellular network modem, wherein the WLAN access point and the cellular network modem are separate communication components of the small cell base station;

determining, by the small cell base station, that there is a clean channel to be the operating channel for the cellular network based on the channel scan, wherein the clean channel comprises a channel that interferes with the WLAN less than a WLAN interference threshold;

in response to determining, by the WLAN access point of the small cell base station, that there is the clean channel to be the operating channel for the cellular network, providing the clean channel to the cellular network modem; and in response to receiving, by the WLAN access point of the small cell base station, the clean channel based on the clean channel being available, selecting, by the cellular network modem, the clean channel as the operating channel for the cellular network.

2. The method of claim 1, wherein the clean channel comprises a channel with a maximum beacon received signal strength indicator (RSSI) less than an RSSI threshold.

3. The method of claim 2, wherein the WLAN interference threshold comprises the RSSI threshold.

4. The method of claim 1, further comprising:
assigning a utility value to each available channel that has a maximum beacon RSSI less than an RSSI threshold, wherein the utility value is based on a noise floor and the maximum beacon RSSI.

5. The method of claim 4, wherein the selected operating channel comprises an available channel with a highest utility value.

6. The method of claim 1, further comprising:
performing the channel scan periodically or in response to an event.

7. The method of claim 6, wherein the event comprises detection, by the WLAN access point or a user device connected to the WLAN access point, of interference on the operating channel higher than a threshold.

8. The method of claim 1, further comprising:
determining whether or not channel switching criteria for switching to a new operating channel based on the channel scan have been met; and
switching to the new operating channel based on determining that the channel switching criteria have been met.

9. The method of claim 8, wherein the channel switching criteria comprise an indication of whether or not a beacon RSSI of a new beacon is greater than the WLAN interference threshold and/or an indication of whether there is a new channel with a higher utility value than the operating channel.

10. The method of claim 1, wherein the cellular network comprises a Long Term Evolution (LTE) network in unlicensed spectrum.

11. The method of claim 1, further comprising turning off the cellular network based on no clean channel being available.

12. A method for selecting an operating channel for a cellular network to reduce interference to a wireless local area network (WLAN) operated by a small cell base station, comprising:
performing, by a cellular network modem of the small cell base station, a first channel scan of available channels for operating the cellular network;
performing, by a WLAN access point of the small cell base station, a second channel scan of the available channels for operating the cellular network, wherein the WLAN access point and the cellular network modem are separate communication components of the small cell base station;
identifying, by the small cell base station, based on the first channel scan, one or more cellular network channels of the available channels that have an interference level below a cellular network interference threshold;
determining, by the small cell base station, based on the second channel scan, that there is a clean channel in the identified one or more cellular network channels to be the operating channel for the cellular network, wherein a clean channel comprises a channel that interferes with the WLAN less than a WLAN interference threshold;
in response to determining, by the small cell base station, that there is the clean channel to be the operating channel for the cellular network, providing the clean channel to the cellular network modem; and
in response to receiving the clean channel based on the clean channel being available, selecting, by the cellular network modem, the clean channel as the operating channel for the cellular network.

13. The method of claim 12, wherein the clean channel comprises a channel with a maximum beacon received signal strength indicator (RSSI) less than an RSSI threshold.

14. The method of claim 13, wherein the WLAN interference threshold comprises the RSSI threshold.

15. The method of claim 12, further comprising:
assigning a utility value to each of the one or more cellular network channels that has a maximum beacon RSSI less than an RSSI threshold, wherein the utility value is based on a noise floor and the maximum beacon RSSI.

16. The method of claim 15, wherein the selected operating channel comprises an available channel with a highest utility value.

17. The method of claim 12, further comprising:
performing the first and second channel scans periodically or in response to an event.

18. The method of claim 17, wherein the event comprises detection, by the WLAN access point or a user device connected to the WLAN access point, of interference on the operating channel higher than a threshold.

19. The method of claim 12, further comprising:
determining whether or not channel switching criteria for switching to a new operating channel based on the second channel scan have been met; and
switching to the new operating channel based on determining that the channel switching criteria have been met.

20. The method of claim 19, wherein the channel switching criteria comprise an indication of whether or not a beacon RSSI of a new beacon is greater than the WLAN interference threshold and/or an indication of whether there is a new channel with a higher utility value than the operating channel.

21. The method of claim 12, wherein the cellular network comprises a Long Term Evolution (LTE) network in unlicensed spectrum.

22. The method of claim 12, further comprising:
based on no cellular network channel with an interference level below the cellular network interference threshold being available, filtering out unavailable cellular network channels.

23. The method of claim 22, wherein the filtering comprises:
generating a clean cellular network signal by performing successive interference cancellation on a cellular network signal with an interference level above the cellular network interference threshold; and
providing the clean cellular network signal to the WLAN access point.

24. The method of claim 23, wherein the clean cellular network signal comprises a waveform that does not include the cellular network signal with the interference level above the cellular network interference threshold and contains only residual WLAN access point signals for beacon detection.

25. The method of claim 23, wherein the performing the successive interference cancellation and the providing are performed by a user device in communication with the small cell.

26. The method of claim 23, wherein the performing the successive interference cancellation and the providing are performed by the small cell.

27. The method of claim 22, wherein the filtering comprises:
  performing a network listen to search for any cellular network signals with an interference level above the cellular network interference threshold that overlap with a scan period of the WLAN access point;
  detecting an access point beacon miss in a given scan period of the WLAN access point;
  determining whether the access point beacon miss is correlated to a presence of a cellular network signal; and
  based on the access point beacon miss being correlated to a presence of a cellular network signal, maintaining a previous access point beacon RSSI for a cellular network channel corresponding to the cellular network signal until the interference level is not above the cellular network interference threshold.

28. The method of claim 22, wherein the filtering comprises:
  synchronizing channel scans of available WLAN access point channels among a plurality of small cells belonging to a same operator, the plurality of small cells including the small cell; and
  muting the small cell to permit the WLAN access point to determine a current wireless environment of the small cell.

29. The method of claim 12, wherein the available channels comprise all cellular network channels available for operating the cellular network.

30. The method of claim 12, further comprising turning off the cellular network based on no clean channel being available.

31. An apparatus for selecting an operating channel for a cellular network to reduce interference to a wireless local area network (WLAN) operated by a small cell base station, comprising:
  a WLAN access point of the small cell base station configured to perform a channel scan of available channels, wherein the small cell base station comprises the WLAN access point and a cellular network modem, wherein the WLAN access point and the cellular network modem are separate communication components of the small cell base station;
  a logic circuit of the small cell base station configured to determine that there is a clean channel to be the operating channel for the cellular network based on the channel scan, wherein a clean channel comprises a channel that interferes with the WLAN less than a WLAN interference threshold; and
  a logic circuit of the small cell base station configured to provide, in response to the determination that there is the clean channel to be the operating channel for the cellular network, the clean channel to the cellular network modem,
  wherein the cellular network modem is configured to select, in response to reception of the clean channel based on the clean channel being available, the clean channel as the operating channel for the cellular network.

32. The apparatus of claim 31, wherein the clean channel comprises a channel with a maximum beacon received signal strength indicator (RSSI) less than an RSSI threshold.

33. The apparatus of claim 32, wherein the WLAN interference threshold comprises the RSSI threshold.

34. The apparatus of claim 31, further comprising:
  a logic circuit configured to assign a utility value to each available channel that has a maximum beacon RSSI less than an RSSI threshold, wherein the utility value is based on a noise floor and the maximum beacon RSSI.

35. The apparatus of claim 34, wherein the selected operating channel comprises an available channel with a highest utility value.

36. The apparatus of claim 31, further comprising:
  a logic circuit configured to perform a channel scan periodically or in response to an event.

37. The apparatus of claim 36, wherein the event comprises detection, by the WLAN access point or a user device connected to the WLAN access point, of interference on the operating channel higher than a threshold.

38. The apparatus of claim 31, further comprising:
  a logic circuit configured to determine whether or not channel switching criteria for switching to a new operating channel based on the channel scan have been met; and
  a logic circuit configured to switch to the new operating channel based on a determination that the channel switching criteria have been met.

39. The apparatus of claim 38, wherein the channel switching criteria comprise an indication of whether or not a beacon RSSI of a new beacon is greater than the WLAN interference threshold and/or an indication of whether there is a new channel with a higher utility value than the operating channel.

40. The apparatus of claim 31, wherein the cellular network comprises a Long Term Evolution (LTE) network in unlicensed spectrum.

41. An apparatus for selecting an operating channel for a cellular network to reduce interference to a wireless local area network (WLAN) operated by a small cell base station, comprising:
  a cellular network modem of the small cell base station configured to perform a first channel scan of available channels for operating the cellular network;
  a WLAN access point of the small cell base station configured to perform a second channel scan of the available channels for operating the cellular network, wherein the WLAN access point and the cellular network modem are separate communication components of the small cell base station;
  a logic circuit of the small cell base station configured to identify, based on the first channel scan, one or more cellular network channels of the available channels that have an interference level below a cellular network interference threshold;
  a logic circuit of the small cell base station configured to determine, based on the second channel scan, that there is a clean channel in the identified one or more cellular network channels to be the operating channel for the cellular network, wherein a clean channel comprises a channel that interferes with the WLAN less than a WLAN interference threshold; and
  a logic circuit of the small cell base station configured to provide, in response to the determination that there is the clean channel to be the operating channel for the cellular network, the clean channel to the cellular network modem,
  wherein the cellular network modem is further configured to select, in response to reception of the clean channel based on the clean channel being available, the clean channel as the operating channel for the cellular network.

42. The apparatus of claim 41, wherein the clean channel comprises a channel with a maximum beacon received signal strength indicator (RSSI) less than an RSSI threshold.

43. The apparatus of claim 42, wherein the WLAN interference threshold comprises the RSSI threshold.

44. The apparatus of claim 41, further comprising:
a logic circuit configured to assign a utility value to each of the one or more cellular network channels that has a maximum beacon RSSI less than an RSSI threshold, wherein the utility value is based on a noise floor and the maximum beacon RSSI.

45. The apparatus of claim 44, wherein the selected operating channel comprises an available channel with a highest utility value.

46. The apparatus of claim 41, wherein the cellular network modem and the WLAN access point are configured to perform the first and second channel scans periodically or in response to an event.

47. The apparatus of claim 46, wherein the event comprises detection, by the WLAN access point or a user device connected to the WLAN access point, of interference on the operating channel higher than a threshold.

48. The apparatus of claim 41, further comprising:
a logic circuit configured to determine whether or not channel switching criteria for switching to a new operating channel based on the second channel scan have been met; and
a logic circuit configured to switch to the new operating channel based on a determination that the channel switching criteria have been met.

49. The apparatus of claim 48, wherein the channel switching criteria comprise an indication of whether or not a beacon RSSI of a new beacon is greater than the WLAN interference threshold and/or an indication of whether there is a new channel with a higher utility value than the operating channel.

50. The apparatus of claim 41, wherein the cellular network comprises a Long Term Evolution (LTE) network in unlicensed spectrum.

51. The apparatus of claim 41, further comprising:
a logic circuit configured to filter out unavailable cellular network channels based on no cellular network channel with an interference level below the cellular network interference threshold being available.

52. The apparatus of claim 51, wherein the logic circuit configured to filter comprises:
a logic circuit configured to perform a network listen to search for any cellular network signals with an interference level above the cellular network interference threshold that overlap with a scan period of the WLAN access point;
a logic circuit configured to detect an access point beacon miss in a given scan period of the WLAN access point;
a logic circuit configured to determine whether the access point beacon miss is correlated to a presence of a cellular network signal; and
a logic circuit configured to maintain, based on the access point beacon miss being correlated to a presence of a cellular network signal, a previous access point beacon RSSI for a cellular network channel corresponding to the cellular network signal until the interference level is not above the cellular network interference threshold.

53. The apparatus of claim 51, wherein the logic circuit configured to filter comprises:
a logic circuit configured to generate a clean cellular network signal by performance of successive interference cancellation on a cellular network signal with an interference level above the cellular network interference threshold; and
a logic circuit configured to provide the clean cellular network signal to the WLAN access point.

54. The apparatus of claim 53, wherein the clean cellular network signal comprises a waveform that does not include the cellular network signal with the interference level above the cellular network interference threshold and contains only residual WLAN access point signals for beacon detection.

55. The apparatus of claim 53, wherein the logic circuit configured to generate the clean cellular network signal and the logic circuit configured to provide are components of a user device in communication with the small cell.

56. The apparatus of claim 53, wherein the logic circuit configured to generate the clean cellular network signal and the logic circuit configured to provide are components of the small cell.

57. The apparatus of claim 51, wherein the logic circuit configured to filter comprises:
a logic circuit configured to synchronize channel scans of available WLAN access point channels among a plurality of small cells belonging to a same operator, the plurality of small cells including the small cell; and
a logic circuit configured to mute the small cell to permit the WLAN access point to determine a current wireless environment of the small cell.

58. The apparatus of claim 41, wherein the available channels comprise all cellular network channels available for operating the cellular network.

59. A small cell base station capable of selecting an operating channel for a cellular network to reduce interference to a wireless local area network (WLAN) operated by the small cell base station, comprising:
a cellular network modem;
a WLAN access point configured to perform a channel scan of available channels wherein the WLAN access point and the cellular network modem are separate communication components of the small cell base station;
a processor of the small cell base station configured to determine that there is a clean channel to be the operating channel for the cellular network based on the channel scan, wherein a clean channel comprises a channel that interferes with the WLAN less than a WLAN interference threshold, and to provide, in response to the determination that there is the clean channel to be the operating channel for the cellular network, the clean channel to the cellular network modem,
wherein the cellular network modem is configured to select, in response to reception of the clean channel based on the clean channel being available, the clean channel as the operating channel for the cellular network.

60. A small cell base station capable of selecting an operating channel for a cellular network to reduce interference to a wireless local area network (WLAN) operated by the small cell base station, comprising:
a cellular network modem configured to perform a first channel scan of available channels for operating the cellular network;
a WLAN access point configured to perform a second channel scan of the available channels for operating the cellular network, wherein the WLAN access point and the cellular network modem are separate communication components of the small cell base station; and
a processor of the small cell base station configured to identify, based on the first channel scan, one or more cellular network channels of the available channels that have an interference level below a cellular network interference threshold, to determine, based on the second channel scan, that there is a clean channel in the identified one or more cellular network channels to be the operating channel for the cellular network, wherein a clean channel comprises a channel that interferes with the WLAN less than a WLAN interference threshold, and to provide, in response to the determination that there is the clean channel to be the operating channel for the cellular network, the clean channel to the cellular network modem, wherein the cellular network modem of the small cell base station is configured to select, in response to reception of the clean channel based on the clean channel being available, the clean channel as the operating channel for the cellular network.

61. An apparatus for selecting an operating channel for a cellular network to reduce interference to a wireless local area network (WLAN) operated by a small cell base station, comprising:

WLAN means for performing a channel scan of available channels, the small cell base station comprising the WLAN means and a cellular network means, wherein the WLAN means and the cellular network means are separate communication components of the small cell base station;

means for determining that there is a clean channel to be the operating channel for the cellular network based on the channel scan, wherein a clean channel comprises a channel that interferes with the WLAN less than a WLAN interference threshold; and means for providing, in response to the determination that there is the clean channel to be the operating channel for the cellular network, the clean channel to the cellular network means, wherein the cellular network means is further for selecting, in response to reception of the clean channel based on the clean channel being available, the clean channel as the operating channel for the cellular network.

62. An apparatus for selecting an operating channel for a cellular network to reduce interference to a wireless local area network (WLAN) operated by a small cell base station, comprising:

cellular network means for performing a first channel scan of available channels for operating the cellular network;

WLAN means for performing a second channel scan of the available channels for operating the cellular network, wherein the WLAN means and the cellular network means are separate communication components of the small cell base station;

means for identifying, based on the first channel scan, one or more cellular network channels of the available channels that have an interference level below a cellular network interference threshold;

means for determining, based on the second channel scan, that there is a clean channel in the identified one or more cellular network channels to be the operating channel for the cellular network, wherein a clean channel comprises a channel that interferes with the WLAN less than a WLAN interference threshold; and means for providing, in response to the determination that there is the clean channel to be the operating channel for the cellular network, the clean channel to the cellular network means, wherein the cellular network means is further for selecting, in response to reception of the clean channel based on the clean channel being available, the clean channel as the operating channel for the cellular network.

63. A non-transitory computer-readable medium for selecting an operating channel for a cellular network to reduce interference to a wireless local area network (WLAN) operated by a small cell base station, comprising:

at least one instruction instructing a WLAN access point of the small cell base station to perform a channel scan of available channels, wherein the small cell base station comprises the WLAN access point and a cellular network modem, wherein the WLAN access point and the cellular network modem are separate communication components of the small cell base station;

at least one instruction to determine that there is a clean channel to be the operating channel for the cellular network based on the channel scan, wherein a clean channel comprises a channel that interferes with the WLAN less than a WLAN interference threshold;

at least one instruction to provide, in response to the determination that there is the clean channel to be the operating channel for the cellular network, the clean channel to the cellular network modem; and at least one instruction to cause the cellular network modem to select, in response to reception of the clean channel based on the clean channel being available, the clean channel as the operating channel for the cellular network.

64. A non-transitory computer-readable medium for selecting an operating channel for a cellular network to reduce interference to a wireless local area network (WLAN) operated by a small cell base station, comprising:

at least one instruction to cause a cellular network modem of the small cell base station to perform a first channel scan of available channels for operating the cellular network;

at least one instruction to cause a WLAN access point of the small cell base station to perform a second channel scan of the available channels for operating the cellular network, wherein the WLAN access point and the cellular network modem are separate communication components of the small cell base station;

at least one instruction to identify, based on the first channel scan, one or more cellular network channels of the available channels that have an interference level below a cellular network interference threshold;

at least one instruction to determine, based on the second channel scan, that there is a clean channel in the identified one or more cellular network channels to be the operating channel for the cellular network, wherein a clean channel comprises a channel that interferes with the WLAN less than a WLAN interference threshold;

at least one instruction to provide, in response to the determination that there is the clean channel to be the operating channel for the cellular network, the clean channel to the cellular network modem; and at least one instruction to cause the cellular network modem to select, in response to reception of the clean channel based on the clean channel being available, the clean channel as the operating channel for the cellular network.

\* \* \* \* \*